United States Patent
Suzuki

(10) Patent No.: US 12,361,715 B2
(45) Date of Patent: Jul. 15, 2025

(54) NON-TRANSITORY COMPUTER-READABLE RECORDING MEDIUM, GENERATION METHOD, AND INFORMATION PROCESSING DEVICE

(71) Applicant: FUJITSU LIMITED, Kawasaki (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 375 days.

(21) Appl. No.: 17/870,822

(22) Filed: Jul. 22, 2022

(65) Prior Publication Data

US 2023/0031073 A1 Feb. 2, 2023

(30) Foreign Application Priority Data

Jul. 30, 2021 (JP) ................. 2021-126258

(51) Int. Cl.
G06V 20/52 (2022.01)
G06T 7/70 (2017.01)
G06V 40/20 (2022.01)

(52) U.S. Cl.
CPC ............... *G06V 20/52* (2022.01); *G06T 7/70* (2017.01); *G06V 40/23* (2022.01); *G06T 2207/30196* (2013.01); *G06T 2207/30242* (2013.01)

(58) Field of Classification Search
CPC .......... G06V 20/52; G06V 40/23; G06T 7/70; G06T 2207/30196; G06T 2207/30242
See application file for complete search history.

(56) References Cited

U.S. PATENT DOCUMENTS

2016/0203499 A1 7/2016 Yamashita et al.
2019/0114689 A1* 4/2019 Wang ................. G06Q 30/0631
2019/0141021 A1* 5/2019 Isaacson ............ G06Q 30/0635
(Continued)

FOREIGN PATENT DOCUMENTS

CN 109765998 B * 10/2020
CN 113128368 A * 7/2021 ......... G06K 9/00335
(Continued)

OTHER PUBLICATIONS

Oohzadi Maryam et al: "Survey on deep learning methods in human action recognition", IET Computer Vision, the Institution of Engineering and Technology, Michael Faraday House, Six Hills Way, Stevenage, Herts. SG1 2AY, UK, vol. 11, No. 8, Dec. 1, 2017 (Dec. 1, 2017), pp. 623-632, XP006064362.
(Continued)

*Primary Examiner* — Chan S Park
*Assistant Examiner* — Sebastian-Sy Vuchi Ngo
(74) *Attorney, Agent, or Firm* — XSENSUS LLP

(57) ABSTRACT

An information processing device obtains each piece of image data captured within a period of time from entering until exiting of a person at a store. The information processing device identifies joint positions of a skeleton related to the person by analyzing each piece of the image data. The information processing device identifies, as an action which indicates a degree of interest of the person in the product, an action performed by the person to a product in the store from the entering until the exiting, on a basis of the joint positions of the skeleton. The information processing device generates a detection rule that correlates the identified action and the product with each other.

13 Claims, 27 Drawing Sheets

(56) References Cited

U.S. PATENT DOCUMENTS

| | | | |
|---|---|---|---|
| 2019/0179405 A1* | 6/2019 | Sun | G06F 1/1686 |
| 2020/0097070 A1* | 3/2020 | Chen | G06T 7/75 |
| 2021/0027318 A1* | 1/2021 | Yamasaki | G06Q 30/0201 |
| 2021/0157978 A1* | 5/2021 | Haramati | G06F 40/177 |
| 2021/0174426 A1* | 6/2021 | Isaacson | G07G 1/14 |

FOREIGN PATENT DOCUMENTS

| | | | | |
|---|---|---|---|---|
| GB | 2583742 A | * | 11/2020 | G06F 18/24133 |
| JP | 2009-48430 A | | 3/2009 | |
| JP | 2013-41354 A | | 2/2013 | |
| JP | 2019005512 A | * | 1/2019 | |

OTHER PUBLICATIONS

Extended European search report issued in corresponding European Patent Application No. 22186220.4.

Japanese Office Action mailed on Apr. 4, 2023 for the corresponding Japanese patent application No. 2021-126258, 6pp.

Office Action issued on Nov. 9, 2023, in corresponding European patent Application No. 22186220.4, 5 pages.

\* cited by examiner

FIG.3

| CAMERA ID | SALES FLOOR |
|---|---|
| 1 | BABY EQUIPMENT SALES FLOOR |
| 2 | SPORTS EQUIPMENT SALES FLOOR |
| 3 | FURNITURE SALES FLOOR: BEDS |
| 4 | FURNITURE SALES FLOOR: SHELVES |
| ... | ... |

FIG.4

| SALES FLOOR | PRODUCT SIZE | PRODUCT EXAMPLE | PRODUCT ID |
|---|---|---|---|
| BABY EQUIPMENT SALES FLOOR | SMALL | SMALL ITEMS | 242... |
| BABY EQUIPMENT SALES FLOOR | MEDIUM | BABY SLING | ... |
| BABY EQUIPMENT SALES FLOOR | LARGE | BABY STROLLER | ... |
| ... | | | ... |

FIG.5

| PURCHASE TIME | PRODUCT ID |
|---|---|
| 11:01:56 | 2420496 |
| 11:15:23 | 4353243 |
| 11:34:19 | 4353243 |
| 11:55:04 | 4352351 |
| ... | |
| 19:57:35 | 3563432 |

FIG.9

| BODY PART | STATE OF MOVEMENT (TYPE) | DETERMINATION METHOD |
|---|---|---|
| FACE | ORIENTATION (FORWARD, RIGHT, LEFT, UP, DOWN: 5 TYPES) | EACH ORIENTATION IS DETERMINED BY FACE ORIENTATION AND BY WHETHER EACH DIRECTION VECTOR ANGLE IS LESS THAN OR EQUAL TO THRESHOLD |
| | ORIENTATION (BACKWARD: 1 TYPE) | DETECTED BY (FACE FACING RIGHT AND HIPS TWISTING RIGHT) OR (FACE FACING LEFT AND HIPS TWISTING LEFT) |
| ARM (RIGHT/LEFT) | ORIENTATION (FORWARD, BACKWARD, RIGHT, LEFT, UP, DOWN: 6 TYPES) | EACH ORIENTATION IS DETERMINED BY FOREARM ORIENTATION AND BY WHETHER EACH DIRECTION VECTOR ANGLE IS LESS THAN OR EQUAL TO THRESHOLD |
| LEG (RIGHT/LEFT) | ORIENTATION (FORWARD, BACKWARD, RIGHT, LEFT, UP, DOWN: 6 TYPES) | EACH ORIENTATION IS DETERMINED BY LOWER LEG ORIENTATION AND BY WHETHER EACH DIRECTION VECTOR ANGLE IS LESS THAN OR EQUAL TO THRESHOLD |
| ELBOW (RIGHT/LEFT) | BEND/STRETCH (BENDING, STRETCHING: 2 TYPES) | DETERMINED AS STRETCHING WHEN ELBOW ANGLE IS GREATER THAN OR EQUAL TO THRESHOLD, AND AS BENDING WHEN ANGLE IS LESS THAN THRESHOLD |
| KNEE (RIGHT/LEFT) | BEND/STRETCH (BENDING, STRETCHING: 2 TYPES) | DETERMINED AS STRETCHING WHEN KNEE ANGLE IS GREATER THAN OR EQUAL TO THRESHOLD, AND AS BENDING WHEN ANGLE IS LESS THAN THRESHOLD |
| HIPS | TWIST (FORWARD, RIGHT, LEFT: 3 TYPES) | DETERMINED AS RIGHT/LEFT TWIST WHEN ANGLE FORMED BY HIPS AND SHOULDERS IS GREATER THAN OR EQUAL TO THRESHOLD, AND AS FORWARD WHEN ANGLE IS LESS THAN THRESHOLD |

FIG.10A

| DIFFERENCE IN ACTION DEPENDING ON PRODUCE SIZE | | INTEREST: LOOKING | DESIRE: PICKING UP BY HAND | COMPARE: TRYING/COMPARING |
|---|---|---|---|---|
| SMALL | FOOD, WINE, BOOKS, COSMETIC PRODUCTS, ETC. | LOOKING AT FRONT FOR CERTAIN TIME & UNMOVING & WHOLE BODY POSTURE (STANDING OR STOOPING OR SQUATTING) | PUTTING ONE HAND FORWARD & STRETCHING ONE ARM & LOOKING AT ONE HAND / BENDING ONE ARM | WRIST COORDINATES MOVING FREQUENTLY FOR CERTAIN TIME |
| MEDIUM | CLOTHES, BAGS, SPORTS EQUIPMENT, ETC. | | STRETCHING ONE ARM & LOOKING AT ONE HAND | ELBOW AND WRIST COORDINATES MOVING FREQUENTLY FOR CERTAIN TIME |
| LARGE | BABY STROLLERS, BICYCLES, FURNITURE (SOFAS, CHAIRS, BEDS), HOME ELECTRICAL APPLIANCES, ETC. | | | BODY ORIENTATION AND WHOLE BODY MOVEMENT CHANGING FREQUENTLY FOR CERTAIN TIME |
| | PRODUCTS TO BE FIXED AND EXHIBITED (ORNAMENTS, ART WORKS, MAY DOLLS) | | | |

FIG.10B

| MOVEMENT ID | MOVEMENT NAME | PRODUCT SIZE | DEGREE OF INTEREST | BASIC MOVEMENT TRANSITION |
|---|---|---|---|---|
| A | LOOKING | LARGE, MEDIUM, SMALL | LEVEL 1 INTEREST | LOOKING AT FRONT FOR CERTAIN TIME & UNMOVING & WHOLE BODY POSTURE (STANDING OR STOOPING OR SQUATTING) |
| B | PICKING UP BY HAND (SMALL) | SMALL | LEVEL 2 DESIRE | PUTTING ONE HAND FORWARD & STRETCHING ONE ⇔ BENDING ONE ARM & LOOKING AT ONE HAND |
| C | PICKING UP BY HAND (MEDIUM) | MEDIUM | LEVEL 2 DESIRE | BENDING ONE ARM & LOOKING AT ONE HAND |
| D | TRYING (SMALL) | SMALL | LEVEL 3 COMPARE | WRIST COORDINATES MOVING FREQUENTLY FOR CERTAIN TIME |
| E | TRYING (MEDIUM) | MEDIUM | LEVEL 3 COMPARE | ELBOW AND WRIST COORDINATES MOVING FREQUENTLY FOR CERTAIN TIME |
| F | TRYING (LARGE) | LARGE | LEVEL 3 COMPARE | BODY ORIENTATION AND WHOLE BODY MOVEMENT CHANGING FREQUENTLY FOR CERTAIN TIME |

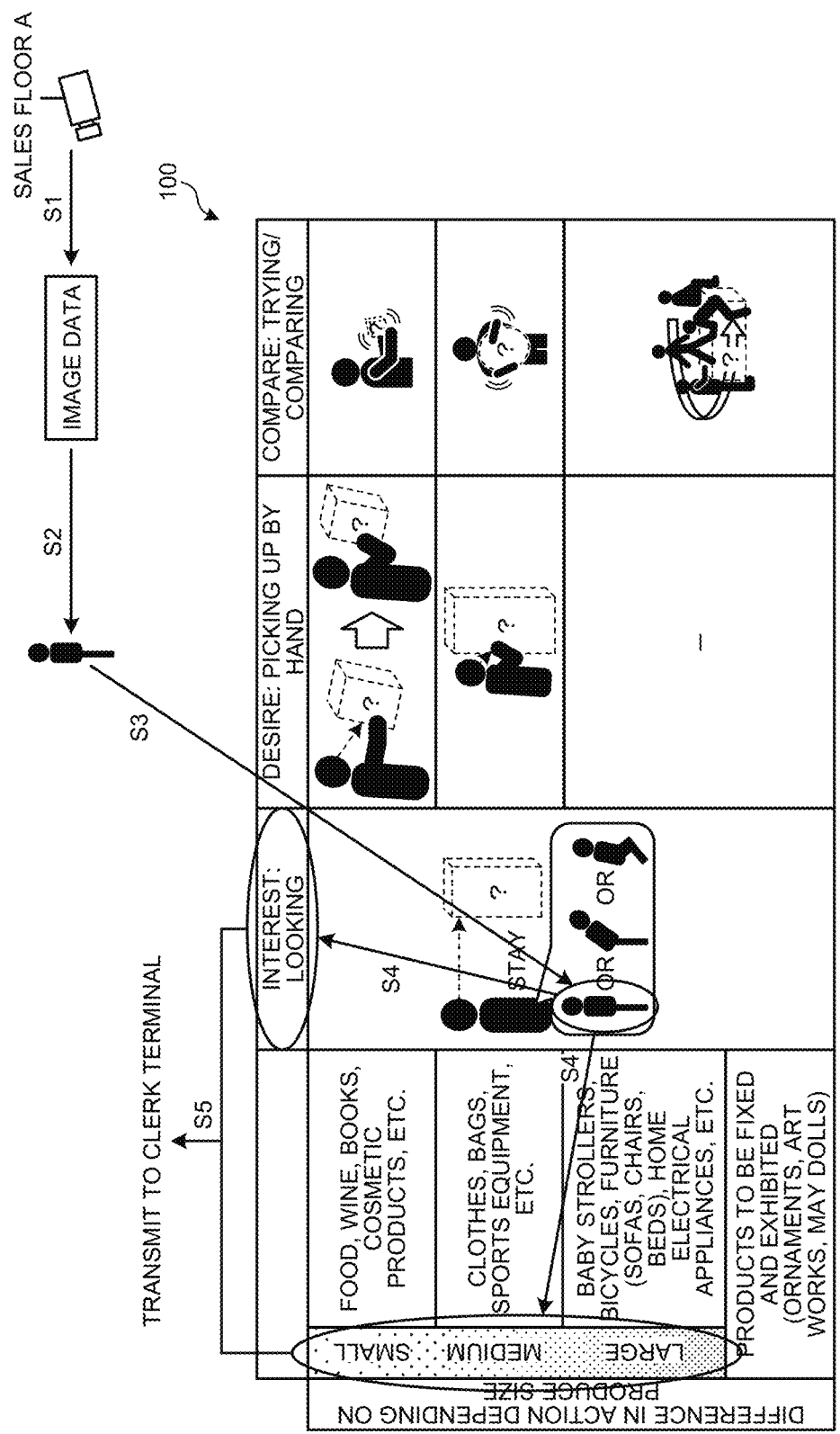

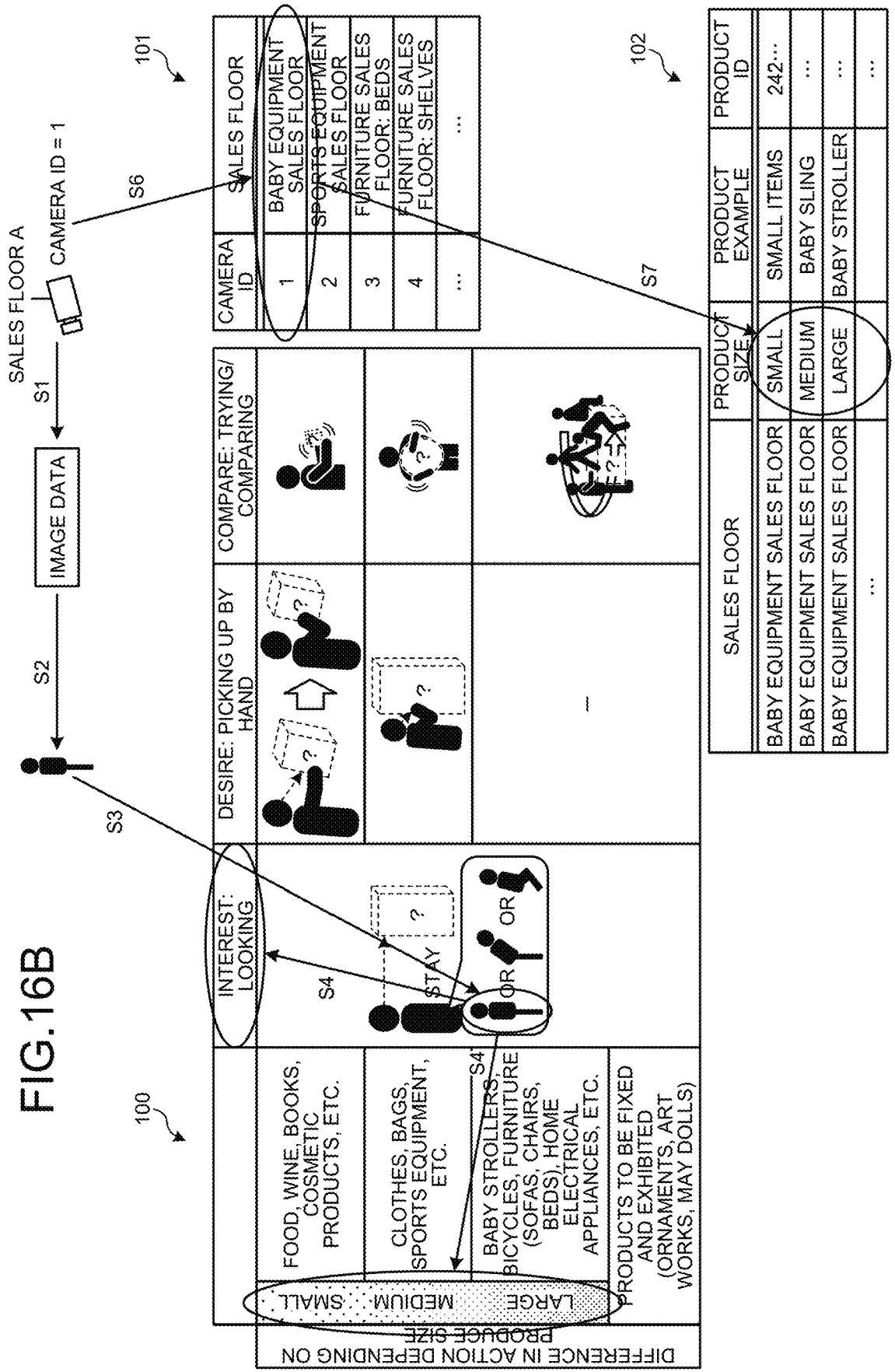

FIG.18
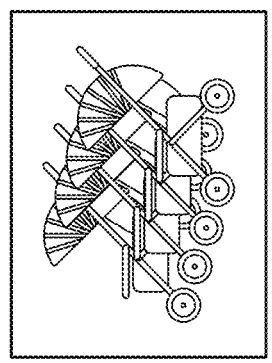
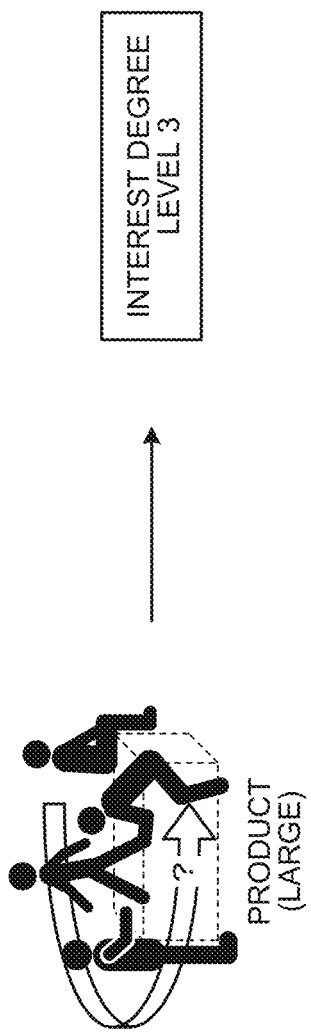
INTEREST DEGREE LEVEL 3

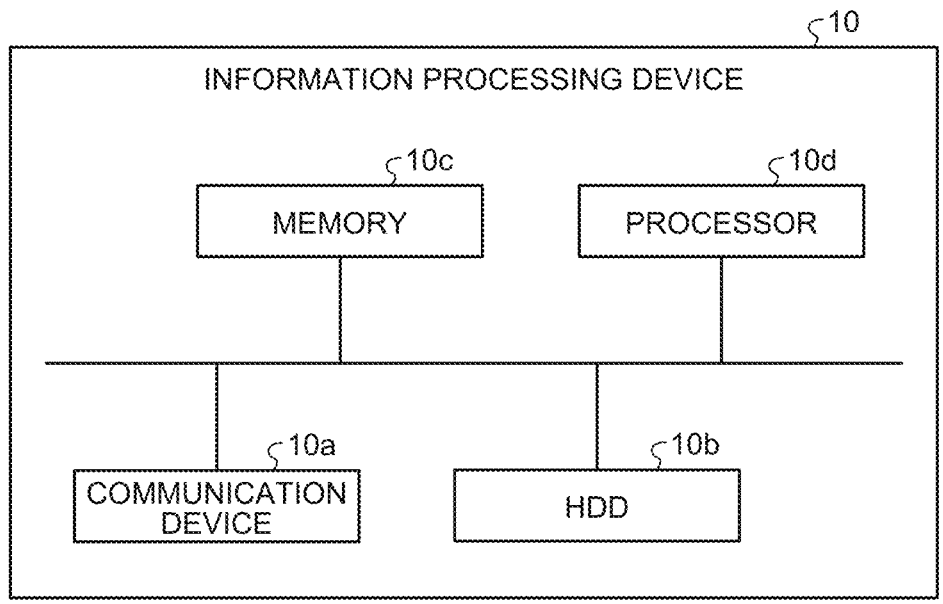

NON-TRANSITORY COMPUTER-READABLE RECORDING MEDIUM, GENERATION METHOD, AND INFORMATION PROCESSING DEVICE

CROSS-REFERENCE TO RELATED APPLICATION

This application is based upon and claims the benefit of priority of the prior Japanese Patent Application No. 2021-126258, filed on Jul. 30, 2021, the entire contents of which are incorporated herein by reference.

FIELD

The embodiments discussed herein are related to a computer-readable recording medium, a generation method, and an information processing device.

BACKGROUND

There are known technical methods for detecting a person's action that represents great interest in a product. For example, there are known technologies, such as a technology that determines whether a customer is picking up a product by hand and looking at the product and especially at the label of the product, a technology that determines from the video the position where a customer's hand has reached on the shelf, and a technology that estimates a customer's posture and identifies movements of stretching a hand for a product, putting the product in a cart, and so forth.

Patent LITERATURE 1: Japanese Laid-open Patent Publication No. 2009-48430

SUMMARY

According to an aspect of an embodiment, a non-transitory computer-readable recording medium stores therein a generating program that causes a computer to execute a process. The process includes obtaining each piece of image data captured within a period of time from entering until exiting of a person at a store, identifying joint positions of a skeleton related to the person by analyzing each piece of the image data, identifying, as an action which indicates a degree of interest of the person in the product, an action performed by the person to a product in the store from the entering until the exiting, on a basis of the joint positions of the skeleton; and generating a detection rule that correlates the identified action and the product with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of the information stored in a camera installation DB;

FIG. 4 is a diagram illustrating an example of the information stored in a product DB;

FIG. 5 is a diagram illustrating an example of the information stored in a POS data DB;

FIG. 9 is a diagram for explaining detection of the movements of individual parts;

FIG. 10A is a diagram for explaining detection rules;

FIG. 10B is a diagram for explaining digitization of the detection rules;

FIG. 16A is a diagram for explaining a detection example 1 according to the second embodiment;

FIG. 16B is a diagram for explaining the detection example 1 according to the second embodiment;

FIG. 18 is a diagram for explaining a detection example 3 according to the second embodiment;

FIG. 25 is a diagram for explaining an example of a hardware configuration.

DESCRIPTION OF EMBODIMENTS

In the case of the technologies described above, however, detection rules for respective products need to be generated to detect customers highly effective in customer service. It is time-consuming and labor-intensive to manually generate detection rules for respective ones of a huge number of products. This is unrealistic and thus makes it difficult to find customers highly effective in customer service.

Specifically, depending on the type of product, a person's action that represents interest in the product varies, so it is preferable to create a rule for each product, but it is difficult to do so in reality because the number of products is huge. For example, when the product is a bicycle, a rule is assumed to detect the action of riding the bicycle, the action of grabbing a handlebar of the bicycle, or the like. Alternatively, when the product is a sofa, a rule is assumed to detect sitting or the like on the sofa. Further, when the product is a cosmetic product, another rule needs to be created.

Preferred embodiments will be explained with reference to accompanying drawings. The present invention is not limited to the following embodiments. Further, disclosed embodiments may be combined as appropriate to an extent within the consistent range.

[a] First Embodiment

Overall Configuration

In various stores of, e.g., food, furniture, and stationery, some of the coming customers are those who are considering their purchase, those who want to hear more detailed information to make purchase but do not have clerks nearby, or those who are not good at talking to clerks voluntarily by themselves. Since such customers interested in products are often customers with strong purchase consciousness, it is possible to bring about high merits for both of the store and customer sides when the store side proactively provides a customer service to the customer side. This is because the stores can increase the number of times of purchase, and the customer side can make purchase after receiving certain explanation.

On the other hand, since a person's action that represents interest varies depending on the product, it is preferable to create a rule for each product to detect such a customer highly effective in customer service, but it is difficult to do so in reality. In light of the above, the first embodiment uses detection rules defined, on the basis of the past actions, the presence or absence of product purchase, and so forth, as combinations of basic movements for several stages (such as three stages) of actions based on the degrees of interest in products, to detect a customer highly effective in customer service without depending on the product.

Figure 1:
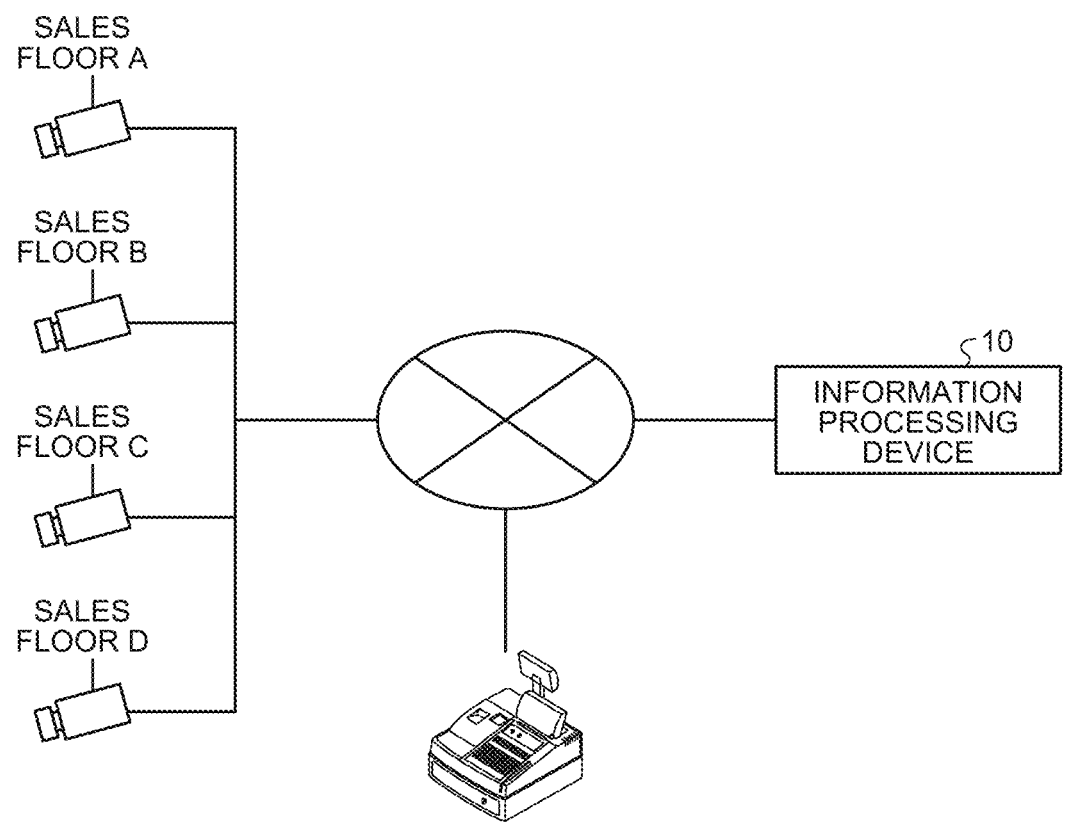
FIG. 1 is a diagram illustrating an example of the overall configuration of a detection rule generation system according to a first embodiment.

FIG. 1 is a diagram illustrating an example of the overall configuration of a detection rule generation system according to the first embodiment. As illustrated in FIG. 1, in this system, cameras installed in the respective ones of a sales floor A, a sales floor B, a sales floor C, and a sales floor D, a camera installed at a cash register (POS device), and an information processing device 10 are connected to each other through networks, such as the internet, regardless of whether the networks are wired or wireless.

The camera of each sales floor is set at the position to capture the images of the products in the sales floor. The camera captures image data, moving picture data, video data, or the like, and periodically transmits the data to the information processing device 10. Further, each product within the imaging area of each camera is assigned a product ID that identifies the product, coordinates that identifies the position of the product, and so forth. Thus, it is possible to perform control while identifying the type and position of the product.

The POS device periodically transmits the purchase history of each product to the information processing device 10. For example, the POS device transmits POS data that correlates purchase times and product IDs with each other to the information processing device 10.

The information processing device 10 is an example of a computer device that analyzes the image data received from the camera on each sales floor to identify what type of action each of the customers performed to purchase a product or to become interested in a product, and to generate detection rules to detect a customer highly effective in customer service.

Specifically, the information processing device 10 obtains each piece of image data captured within the period of time from the entering until the exiting of a person at the store, and identifies the actions of the person performed to each product in the store from the entering until the exiting of the person on the basis of each piece of the image data. Then, the information processing device 10 determines the degree of interest of the person in the product on the basis of the identified actions, and generates detection rules each of which correlates the determined degree of interest and the product with each other.

As described above, the information processing device 10 generates detection rules that do not depend on the product. Consequently, it is possible to detect a customer highly effective in customer service, without performing complicated analysis on the image data at the time when a customer comes, and without performing a huge amount of action recognition.

Functional Configuration

Figure 2:
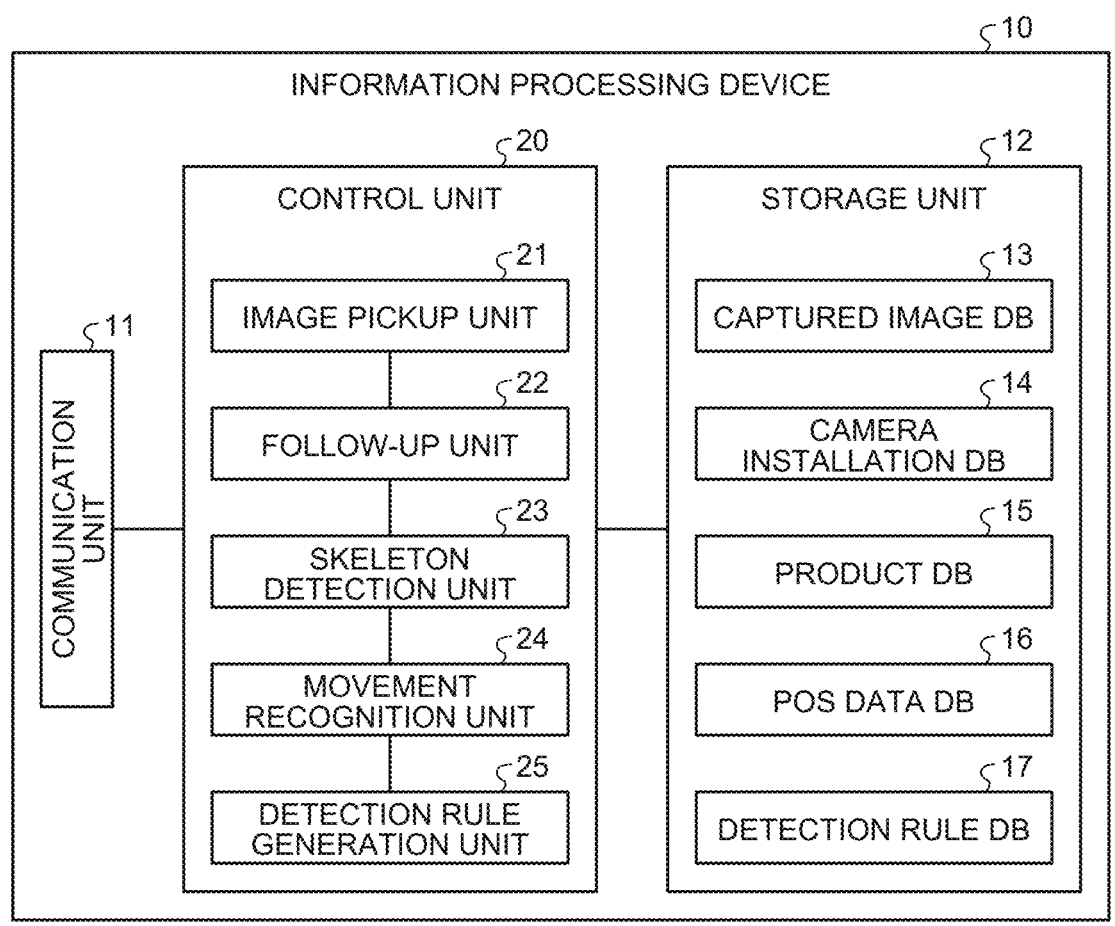
FIG. 2 is a functional block diagram illustrating the functional configuration of an information processing device according to the first embodiment.

FIG. 2 is a functional block diagram illustrating the functional configuration of the information processing device 10 according to the first embodiment. As illustrated in FIG. 2, the information processing device 10 includes a communication unit 11, a storage unit 12, and a control unit 20.

The communication unit 11 is a processing unit that controls communication with other devices, and is implemented by, for example, a communication interface. For example, the communication unit 11 receives moving image data (such as image data) from each camera, and receives POS data from the POS device.

The storage unit 12 is an example of a storage device that stores various data and programs to be executed by the control unit 20, and is implemented by, for example, a memory or hard disk. This storage unit 12 stores a captured image DB 13, a camera installation DB 14, a product DB 15, a POS data DB 16, and a detection rule DB 17

The captured image DB 13 is a database that stores variable data captured by the cameras, individually for the respective cameras. In this embodiment, the captured image DB 13 stores image data captured by each camera.

The camera installation DB 14 is a database that stores information that identifies the installation location of each camera. Here, the stored information is set by the administrator or the like. FIG. 3 is a diagram illustrating an example of the information stored in the camera installation DB 14. As illustrated in FIG. 3, the camera installation DB 14 stores "CAMERA ID and SALES FLOOR" in correlation with each other. As the information stored here, the "CAMERA ID" is set with information that identifies each camera, and the "SALES FLOOR" is set with information that identifies the sales floor where each camera is installed. In the example illustrated in FIG. 3, a camera with the camera ID=1 is installed in the baby equipment sales floor, and a camera with the camera ID=2 is installed in the sports equipment sales floor.

The product DB 15 is database that stores information about products placed in each sales floor. Here, the stored information is set by the administrator or the like. FIG. 4 is a diagram illustrating an example of the information stored in the product DB 15. As illustrated in FIG. 4, the product DB 15 stores "SALES FLOOR, PRODUCT SIZE, PRODUCT EXAMPLE, and PRODUCT ID" in correlation with each other. As the information stored here, the "SALES FLOOR" is set with information that identifies each sales floor, the "PRODUCT SIZE" is set with information about the size of each product, the "PRODUCT EXAMPLE" is set with one example of the corresponding product, and the "PRODUCT ID" is set with information that identifies each product. In the example of FIG. 4, it is illustrated that "242 . . . " is set as the product ID for the small items corresponding to the products with a small product size on the baby equipment sales floor.

The POS data DB 16 is a database that stores received POS data. FIG. 5 is a diagram illustrating an example of the information stored in the POS data DB 16. As illustrated in FIG. 5, the POS data DB 16 stores "PURCHASE TIME and PRODUCT ID" in correlation with each other. As the information stored here, the "PURCHASE TIME" is set with the time when each product was purchased, and the "PRODUCT ID" is set with the information that identifies each product. In the example in FIG. 5, it is illustrated that a product with the product ID "2420496" was purchased at "11:01:56".

The detection rule DB 17 is a database that stores the detection rules generated by the information processing device 10. The details of the detection rules will be described later.

The control unit 20 is a processing unit that controls the entire information processing device 10, and is implemented by, for example, a processor or the like. This control unit 20 includes an image pickup unit 21, a follow-up unit 22, a skeleton detection unit 23, a movement recognition unit 24, and a detection rule generation unit 25.

The image pickup unit 21 is a processing unit that captures an image. For example, the image pickup unit 21 receives image data captured by each camera, and stores the data in the captured image DB 13.

The follow-up unit 22 is a processing unit that obtains each piece of image data captured within the period of time from the entering until the exiting of a person at the store. Specifically, the follow-up unit 22 extracts a piece of image data in which a product and a person appear from a plurality of pieces of image data captured by each camera, and outputs the piece of image data to the skeleton detection unit 23, or stores the piece of image data in the storage unit 12.

Figure 6:
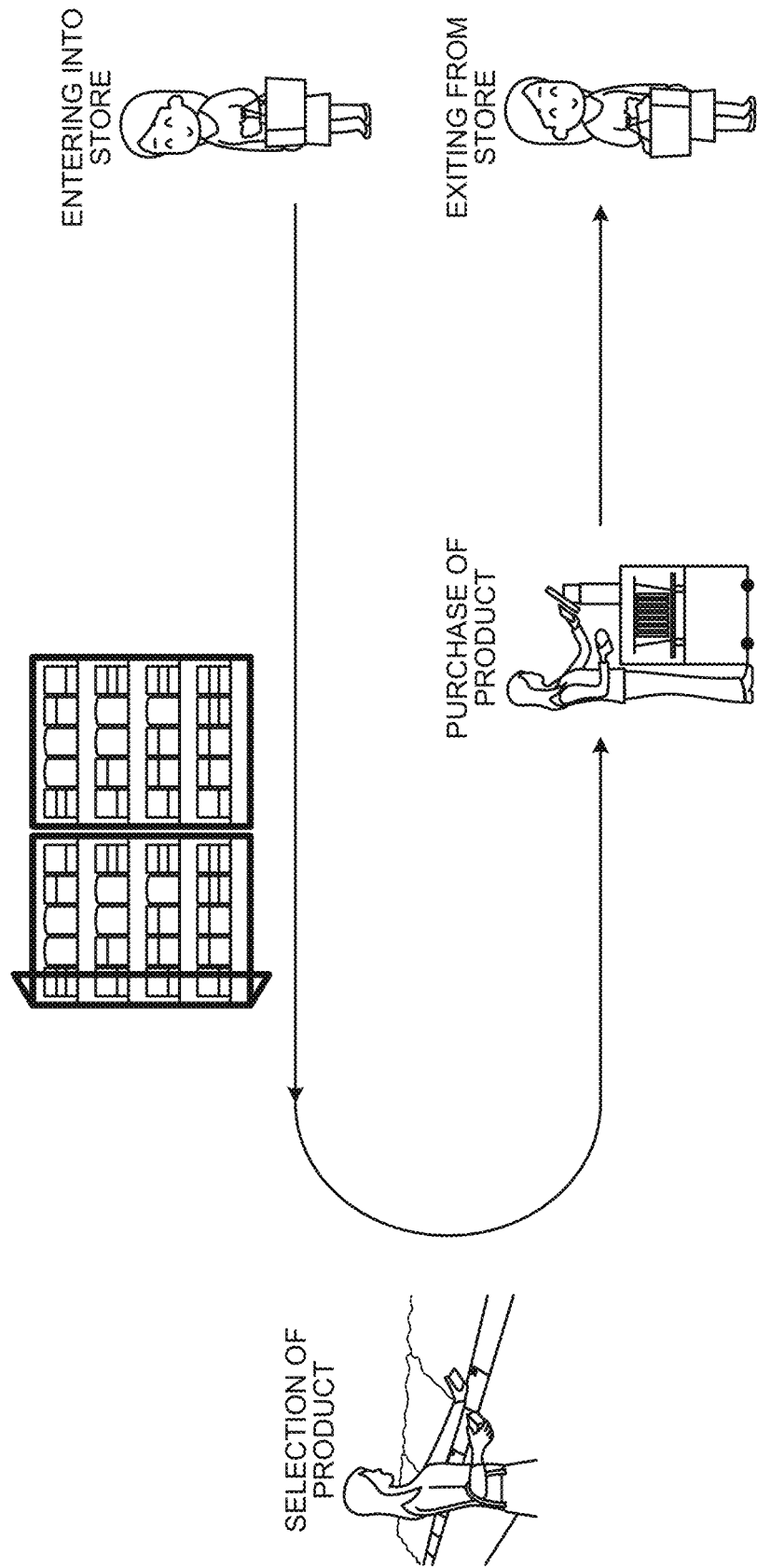
FIG. 6 is a diagram for explaining follow-up of a customer.

For example, the follow-up unit 22 follows up a certain person from the entering until the exiting at the store, and obtains each piece of image data of this person captured in the store. FIG. 6 is a diagram for explaining the follow-up of a customer. As illustrated in FIG. 6, the follow-up unit 22 performs general image analysis on the image data captured by the camera at the entrance of the store, and identifies the face image of a person included therein to identify the person who entered. After that, the follow-up unit 22 obtains image data in which the person appears from the image data of the cameras set in the store, until the person is detected from the image data captured by the camera at the exit of the store. Consequently, the follow-up unit 22 can obtain the image data of each person within the period of time from the entering of the person into the store, through the selection and purchase of a product, until the exiting from the store.

The skeleton detection unit 23 is a processing unit that obtains the skeletal information of a person appearing in image data. Specifically, for each person detected by the follow-up unit 22, the skeleton detection unit 23 performs skeleton detection of the person on the image data in which the person and a product appear among the image data obtained by the follow-up unit 22.

Figure 7:
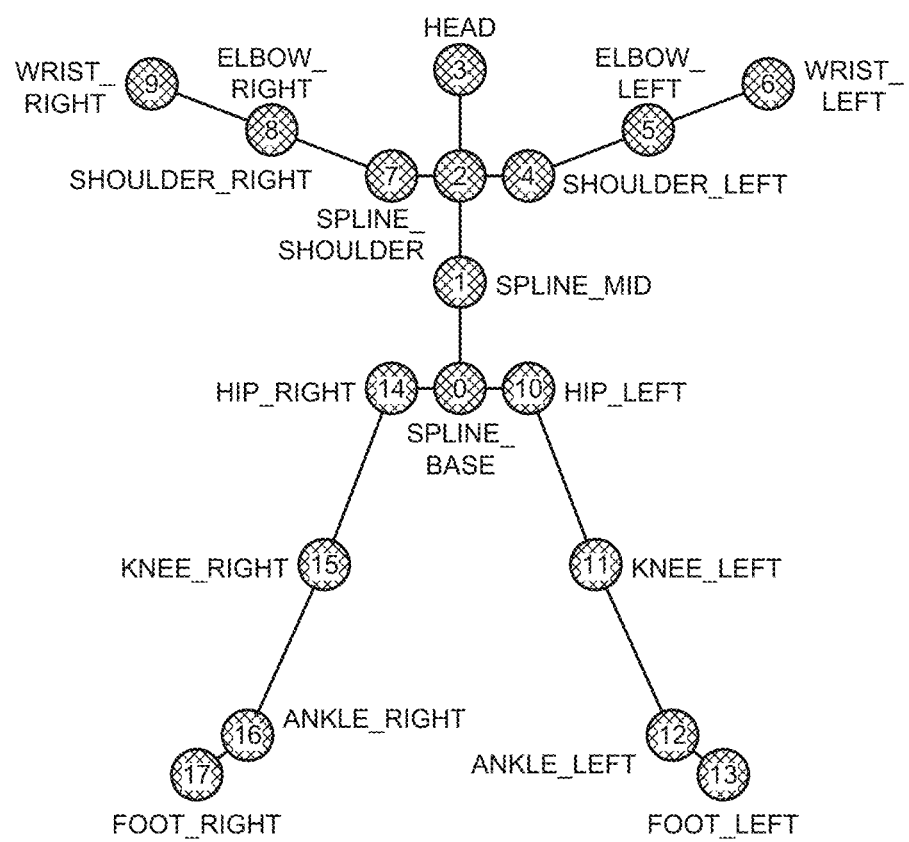
FIG. 7 is a diagram illustrating an example of skeletal information.

For example, the skeleton detection unit 23 obtains the skeletal information by inputting image data (each frame) into a trained machine learning model. FIG. 7 is a diagram illustrating an example of the skeletal information. For the skeletal information, it is possible to use 18 pieces of definition information (the number 0 to the number 17), in which numbers are applied to the respective joints identified by a known skeletal model. For example, the right shoulder joint (SHOULDER_RIGHT) is assigned the number 7, the left elbow joint (ELBOW_LEFT) is assigned the number 5, the left knee joint (KNEE_LEFT) is assigned the number 11, and the right hip joint (HIP_RIGHT) is assigned the number 14. Therefore, the skeleton detection unit 23 can obtain 18 pieces of skeletal coordinate information illustrated in FIG. 7, from the image data. For example, the skeleton detection unit 23 obtains "the X-coordinate=X7, the Y-coordinate=Y7, and the Z-coordinate=Z7" as the position of the right shoulder joint of the number 7. Here, for example, it may be defined that the Z-axis is in the distance direction from the image pickup device to the target, the Y-axis is in the height direction perpendicular to the Z-axis, and the X-axis is in the horizontal direction.

Figure 8:
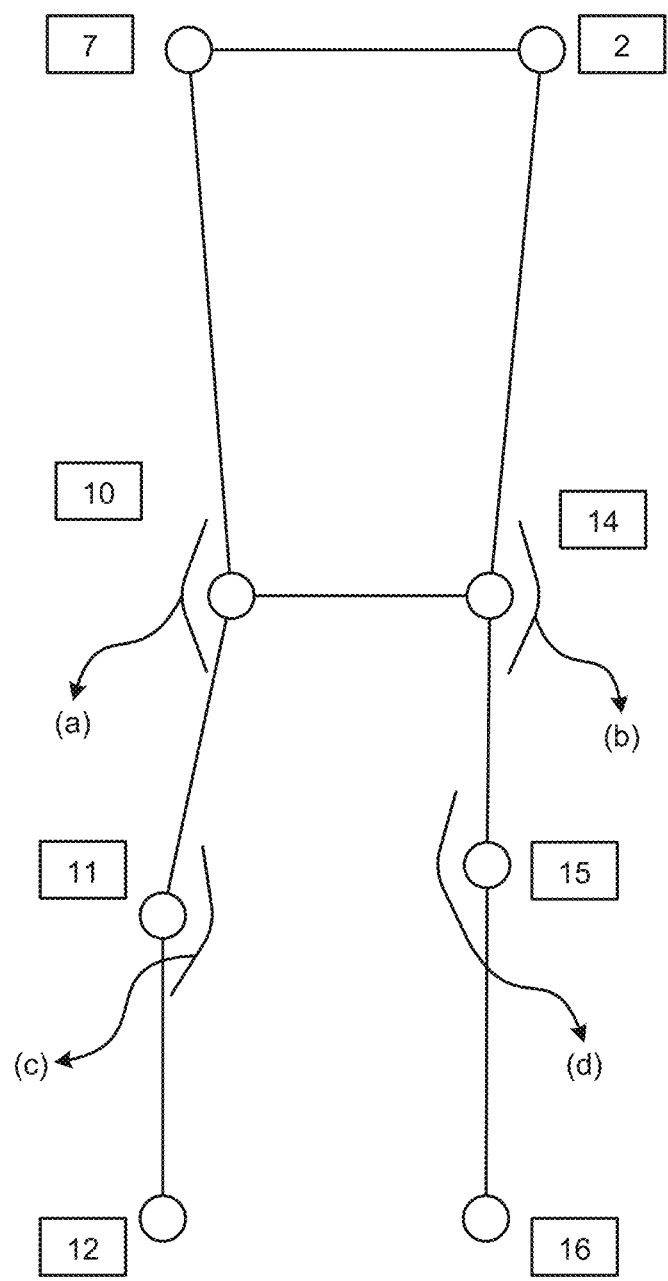
FIG. 8 is a diagram for explaining determination of the whole body posture.

Further, the skeleton detection unit 23 can also determine the whole body posture, such as standing, walking, squatting, sitting, and lying, by use of a machine learning model trained in advance for skeletal patterns. For example, the skeleton detection unit 23 can determine the nearest whole body posture, by use of a machine learning model trained with Multilayer Perceptron for some joints and joint-to-joint angles, such as the skeletal information of FIG. 7 and aesthetic diagrams. FIG. 8 is a diagram for explaining determination of the whole body posture. As illustrated in FIG. 8, the skeleton detection unit 23 can detect the whole body posture, by obtaining the angle (a) of the joint between the "HIP_LEFT" of the number 10 and the "KNEE_LEFT" of the number 11, the angle (b) of the joint between the "HIP_RIGHT" of the number 14 and the "KNEE_RIGHT" of the number 15, the angle (c) of the "KNEE_LEFT" of the number 11, the angle (d) of the "KNEE_RIGHT" the number 15, etc.

Further, the skeleton detection unit 23 can detect movements of individual parts by performing part posture determination on the basis of the 3D joint posture of the body. Specifically, the skeleton detection unit 23 can perform conversion from 2D joint coordinates to 3D joint coordinates by use of a 3D-baseline technical method.

FIG. 9 is a diagram for explaining the detection of the movements of individual parts. As illustrated in FIG. 9, for the part "FACE", the skeleton detection unit 23 can detect the face orientation as one of the orientations (five types) of forward, right, left, up, and down, on the basis of the face orientation and of whether the angle of each direction vector is less than or equal to a threshold. Here, the skeleton detection unit 23 identifies the face orientation by the vector defined by "the start point: the midpoint of both ears, and the end point: nose". Further, the skeleton detection unit 23 can detect whether the face is facing backward by "the face facing right and the hips twisting right" or "the face facing left and the hips twisting left".

For the part "ARM", the skeleton detection unit 23 can detect the orientation of each of the right and left arms as one of the orientations (six types) of forward, backward, right, left, up, and down, on the basis of the direction of the forearm and of whether the angle of each direction vector is less than or equal to a threshold. Here, the skeleton detection unit 23 can detect the orientation of the arm by a vector defined by "the start point: elbow, and the end point: wrist".

For the part "LEG", the skeleton detection unit 23 can detect the orientation of each of the right and left legs as one of the orientations (six types) of forward, backward, right, left, up, and down, on the basis of the orientation of the lower leg and of whether the angle of each direction vector is less than or equal to a threshold. Here, the skeleton detection unit 23 can detect the orientation of the lower leg by the vector defined by "the start point: knee, and the end point: ankle".

For the part "ELBOW", the skeleton detection unit 23 can detect the state of the elbow as one of the states (two types) of stretching with the elbow angle greater than or equal to a threshold, and bending with the elbow angle less than the threshold. Here, the skeleton detection unit 23 can detect the elbow angle by the angle formed by a vector A of "the start point: elbow, and the end point: shoulder" and a vector B of "the start point: elbow, and the end point: wrist".

For the part "KNEE", the skeleton detection unit 23 can detect the state of the knee as one of the states (two types) of stretching with the knee angle greater than or equal to a threshold, and bending with the knee angle less than the threshold. Here, the skeleton detection unit 23 can detect the knee angle by the angle formed by a vector A of "the start point: knee, and the end point: ankle" and a vector B of "the start point: knee, and the end point: hip".

For the part "HIPS", the skeleton detection unit 23 can detect right and left twists (2 types) on the basis of whether the angle formed by the hips and the shoulders is greater than or equal to a threshold, and can detect forward facing when the angle is less than the threshold. The skeleton detection unit 23 can detect the angle formed by the hips and the shoulders, by use of the rotation angles of a vector A of "the start point: left shoulder, and the end point: right shoulder" and a vector B of "the start point: left hip (hip (L)), and the end point: right hip (hip (R))", around an axis vector C of "the start point: the midpoint of both hips, and the end point: the midpoint of both shoulders".

Returning to FIG. 2, the movement recognition unit 24 is a processing unit that recognizes each movement of a person on the basis of the detection result of skeletal information by the skeleton detection unit 23. Specifically, the movement recognition unit 24 identifies an action containing at least one movement, on the basis of the transition of skeletal information recognized for each of a plurality of consecutive frames.

For example, when the determination for individual parts detects a skeleton in which the face looks at the front, and the determination of the whole body posture detects a skeleton which is standing, such that these skeletons are continuously detected for several frames, the movement recognition unit 24 recognizes the movement of "looking at the front for a certain time". Alternatively, when skeletons are continuously detected for several frames such that the change in the whole body posture is less a predetermined value, the movement recognition unit 24 recognizes the movement of "UNMOVING".

In addition, when skeletons are detected for several frames such that the elbow angle changes to a threshold or more, the movement recognition unit 24 recognizes the movement of "putting one hand forward" or "stretching one arm". Further, when skeletons are detected for several frames such that the elbow angle changes to a threshold or more and then this angle becomes less than the threshold, the movement recognition unit 24 recognizes the movement of "bending one arm". Furthermore, when skeletons are detected for several frames such that the elbow angle changes to a threshold or more and then this angle becomes less than the threshold, and, thereafter, this angle further continues for several frames, the movement recognition unit 24 recognizes the movement of "looking at one hand".

In addition, when skeletons are detected for several frames such that the wrist angle changes continuously, the movement recognition unit 24 recognizes the movement of "the wrist coordinates moving frequently for a certain time". When skeletons are detected for several frames such that the wrist angle changes continuously and the elbow angle changes continuously, the movement recognition unit 24 recognizes the movement of "the elbow coordinates and the wrist coordinates moving frequently for a certain time". When skeletons are detected for several frames such that each of the wrist angle, the elbow angle, and the whole body orientation changes continuously, the movement recognition unit 24 recognizes the movement of "the body orientation and the whole body movement changing frequently for a certain time".

Here, for image data to which the skeleton detection has been performed by the skeleton detection unit 23 and in which a person and a product appear, the movement recognition unit 24 can identify the product on the basis of the imaging area of each camera and the coordinates of the product in the imaging area, and further identify the size of the identified product by referring to the product DB 15. As a result, the movement recognition unit 24 can correlate each movement and each product size with each other.

Returning to FIG. 2, the detection rule generation unit 25 is a processing unit that generates detection rules to detect a customer highly effective in customer service from the coming customers. Specifically, the detection rule generation unit 25 defines combinations of basic movements for the actions of three stages based on the degree of interest, by use of the recognition result of the movement recognition unit 24.

FIG. 10A is a diagram for explaining the detection rules. FIG. 10B is a diagram for explaining the digitization of the detection rules. Here, FIG. 10A illustrates the detection rules in a conceptual state while FIG. 10B illustrates the detection rules in a digitized state, and FIGS. 10A and 10B illustrate the same information.

As illustrated in FIG. 10A, as each detection rule, the detection rule generation unit 25 correlates an action of a person consisting of at least one movement, for each combination of each action corresponding to the degree of interest (the action of looking, the action of picking up by hand, the action of trying/comparing) with the size of each product, which is an example of the attributes of the product. Here, the action of "LOOKING" corresponds to the level 1 of the degree of interest. The action of "PICKING UP BY HAND" corresponds to the level 2 of the degree of interest. The action of "TRYING/COMPARING" corresponds to the level 3 of the degree of interest.

For example, the detection rule generation unit 25 holds in advance the correspondence relation between the actions and the movements that identifies the actions, and aggregates the correlation between each movement and each product size obtained from the movement recognition unit 24. For example, since the action of "LOOKING" is the same in movement regardless of the product size, the detection rule generation unit 25 correlates each product size with the movements of "LOOKING AT FRONT FOR CERTAIN TIME", "UNMOVING", "STANDING", "STOOPING", and "SQUATTING", each of which is as the action of "LOOKING".

Further, since the action of "PICKING UP BY HAND" is different in performed movement depending on the product size, the detection rule generation unit 25 defines this action for each product size. For example, the detection rule generation unit 25 correlates small size products, such as food, and medium size products, such as bags, with a series of movements that performs the movement of "PUTTING ONE HAND FORWARD", "STRETCHING ONE ARM", or "LOOKING AT ONE HAND", and then performs the movement of "BENDING ONE ARM". On the other hand, the detection rule generation unit 25 correlates large size products, such as furniture, with the movements of "BENDING ONE ARM" and "LOOKING AT ONE HAND".

Similarly, since the action of "TRYING/COMPARING" is different in performed movement depending on the product size, the detection rule generation unit 25 defines this action for each product size. For example, the detection rule generation unit 25 correlates small size products, such as food, with the movement of "WRIST COORDINATES MOVING FREQUENTLY FOR CERTAIN TIME". The detection rule generation unit 25 correlates medium size products with the movement of "ELBOW AND WRIST COORDINATES MOVING FREQUENTLY FOR CERTAIN TIME". The detection rule generation unit 25 correlates large size products, such as furniture, with the movement of "BODY ORIENTATION AND WHOLE BODY MOVEMENT CHANGING FREQUENTLY FOR CERTAIN TIME".

Further, the detection rule generation unit 25 may correlate products to be fixed and exhibited, such as ornaments, art works, and May dolls, with some movements by the same processing as described above.

FIG. 10B illustrates information of the result of such correlation in a digitized state. As illustrated in FIG. 10B, it is indicated that, when any one movement is detected among the movements of "LOOKING AT FRONT FOR CERTAIN TIME", "UNMOVING", "STANDING", "STOOPING", and "SQUATTING", this identifies a combination of the action of "LOOKING", whose degree of interest is the level 1, with the product sizes of "LARGE, MEDIUM, and SMALL".

Further, it is indicated that, when a series of movements is detected that performs the movement of "PUTTING ONE HAND FORWARD", "STRETCHING ONE ARM", or "LOOKING AT ONE HAND", and then performs the movement of "BENDING ONE ARM", this identifies a combination of the action of "PICKING UP BY HAND", whose degree of interest is the level 2, with the product size of "SMALL". Similarly, it is indicated that, when the movement of "BENDING ONE ARM" or "LOOKING AT ONE HAND" is detected, this identifies a combination of the action of "PICKING UP BY HAND", whose degree of interest is the level 2, with the product size of "MEDIUM". Here, the "MOVEMENT ID" is set with identifiers that identify the movements specifying the detection rules.

Figure 11:
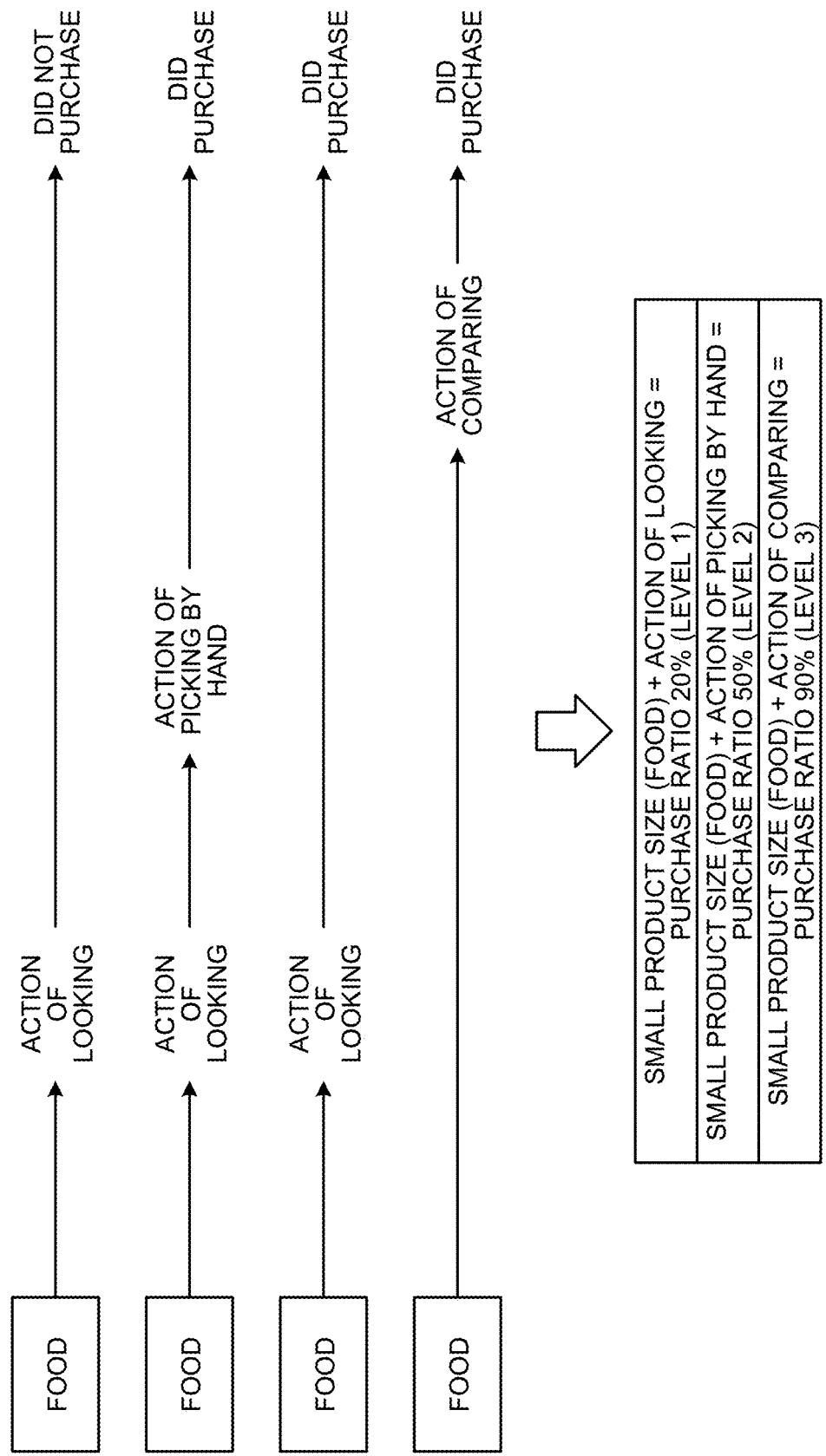
FIG. 11 is a diagram for explaining a determination example of the degree of interest.

Note that the correlation between the degree of interest and each action may be determined by the past history or empirical rule, or may be determined by the actual product purchase frequency or the like. FIG. 11 is a diagram for explaining a determination example of the degree of interest. As illustrated in FIG. 11, the detection rule generation unit 25 generates data that indicates that "a person performed the action of "LOOKING" at a food, and this person did not purchase the food", and data that indicates that "a person performed the action of "LOOKING" at a food and then performed the action of "PICKING UP BY HAND", and this person purchased the food". Further, the detection rule generation unit 25 generates data that indicates that "a person performed the action of "LOOKING" at a food, and this person purchased the food", and data that indicates that "a person performed the action of "LOOKING" at a food and then performed the action of "COMPARING", and this person purchased the food".

These pieces of data are aggregated. When, among the persons who performed the action of "LOOKING" at "FOOD" products, the ratio of the persons who purchased the products is less than a first threshold (such as 30%), the detection rule generation unit 25 determines the degree of interest in the products of the persons who performed the action of "LOOKING" at the "FOOD" products as "LEVEL 1".

Further, when, among the persons who performed the action of "PICKING UP BY HAND" to "FOOD" products, the ratio of the persons who purchased the products is greater than or equal to the first threshold (such as 20%) and is less than a second threshold (such as 70%), the detection rule generation unit 25 determines the degree of interest in the products of the persons who performed the action of "PICKING UP BY HAND" to the "FOOD" products as "LEVEL 2".

Further, when, among the persons who performed the action of "COMPARING" to "FOOD" products, the ratio of the persons who purchased the products is greater than or equal to the second threshold (such as 70%), the detection rule generation unit 25 determines the degree of interest in the products of the persons who performed the action of "COMPARING" to the "FOOD" products as "LEVEL 3". Note that an explanation has been give of the food (small size), i.e., small sized products, as an example, the processing can be performed in the same way for products of each size.

Processing Flow

Figure 12:
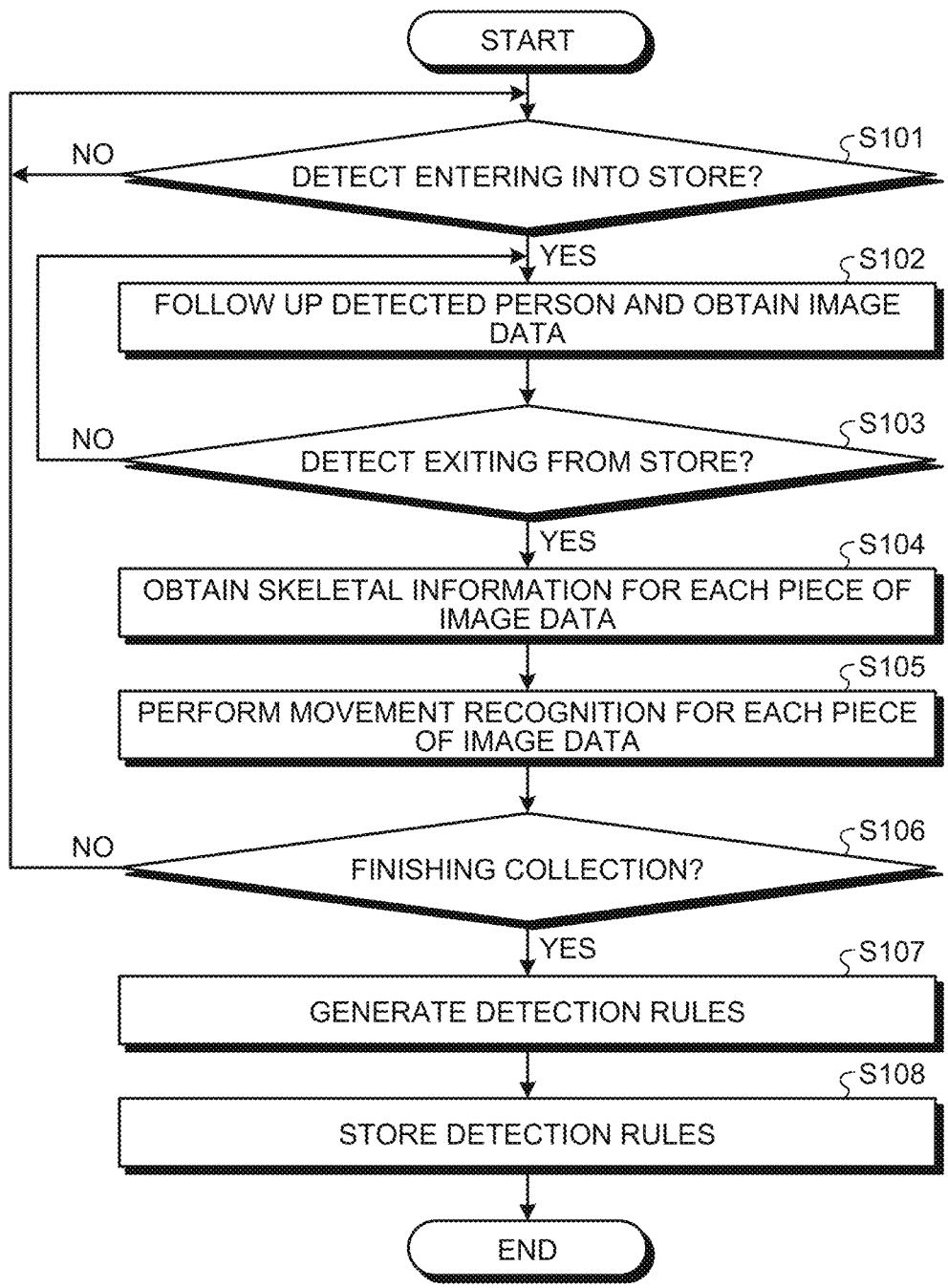
FIG. 12 is a flowchart illustrating the flow of detection rule generation processing.

FIG. 12 is a flowchart illustrating the flow of the detection rule generation processing. As illustrated in FIG. 12, upon detection of the entering of a person into the store on the basis of image data (S101: Yes), the information processing device 10 follows up the detected person and obtains image data (S102). Then, the information processing device 10 repeats S102 and thereafter until the exiting of the person from the store (S103: No), to follow up the detected person and obtain image data.

After that, upon detection of the exiting of the follow-up target person from the store (S103: Yes), the information processing device 10 obtains skeletal information for each piece of the captured image data (S104), and performs movement recognition for each piece of the image data (S105). At this time, the information processing device 10 may execute the skeletal information obtainment and the movement recognition by narrowing down to the image data in which both of the person and product appear.

Here, when continuing the data collection (S106: No), the information processing device 10 repeats S101 and thereafter. On the other hand, when finishing the data collection (S106: Yes), the information processing device 10 generates detection rules each of which correlates movements with each combination of each action and the size of each product (S107). Then, the information processing device 10 stores the detection rules in the storage unit 12 and/or outputs the detection rules (S108).

Variation

In the example described above, an explanation has been given of an example in which the information processing device 10 calculates the ratio of action-recognized users who purchased products, to perform determination of the degree of interest, but this is not limiting. For example, the information processing device 10 may perform the determination by the number of times of touching each product, the period of time of staying in front of each product, or the like.

For example, in order to set the degree of interest higher as the number of times of touching each product is larger, the information processing device 10 may perform the determination such that, when the number of times is less than a first threshold, this is the level 1, when the number of times is greater than or equal to the first threshold and less than a second threshold, this is the level 2, and, when the number of times is greater than or equal to the second threshold, this is the level 3. Similarly, the information processing device 10 may calculate, as the stay time, the period of time the same person is continuously detected in a plurality of consecutive pieces of image data (frames), and set the degree of interest higher as the stay time in front of each product is longer.

In addition, instead of the detection rule for each product size, the information processing device 10 may generate a detection rule for each product type, such as food, large furniture, bicycles, or toys. Further, the information processing device 10 may provide each detection rule with some feedback about the result of the actual customer service using the detection rule. For example, as the result of providing a customer service using a detection rule of a certain level, when the number or ratio of persons who actually purchased products exceeds a threshold, the information processing device 10 may raise the level of the detection rule by one. Conversely, when the number or ratio of persons who actually purchased products falls below the threshold, the information processing device 10 may lower the level of the detection rule by one.

Effect

As described above, the information processing device 10 can generate detection rules that correlate the customer's actions with the feature quantities that identify each product, such as the size and type of the product. Therefore, the information processing device 10 can detect a customer highly effective in customer service, without generating detailed rules for the respective products. Further, since the information processing device 10 can appropriately change the feature quantities and levels in accordance with the store to apply, it is possible to generate detection rules suitable for the store, and to detect a customer highly effective in customer service that matches the location and situation of the store.

[b] Second Embodiment

Overall Configuration

Figure 13:
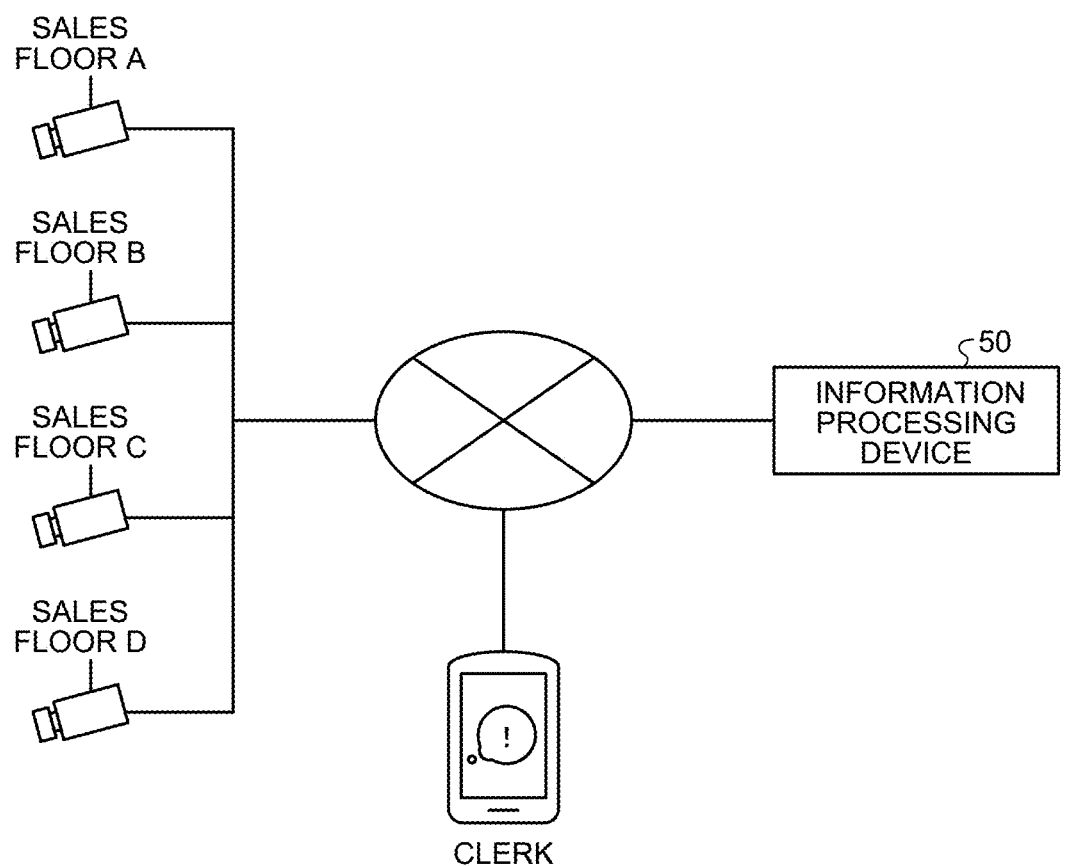
FIG. 13 is a diagram illustrating an example of the overall configuration of a customer service detection system according to a second embodiment.

Next, an explanation will be given of an example of detecting a customer highly effective in customer service from coming customers to a store. FIG. 13 is a diagram illustrating an example of the overall configuration of a customer service detection system according to a second embodiment. As illustrated in FIG. 13, in this system, cameras installed in the respective ones of a sales floor A, a sales floor B, a sales floor C, and a sales floor D, terminals used by clerks, and an information processing device 50 are connected to each other through networks, such as the internet, regardless of whether the networks are wired or wireless.

The camera of each sales floor is set at the position to capture the images of the products in the sales floor. The camera captures image data, moving picture data, video data, or the like, and periodically transmits the data to the information processing device 50. Further, each product within the imaging area of each camera is assigned a product ID that identifies the product, coordinates that identifies the position of the product, and so forth. Thus, it is possible to perform control while identifying the type and position of the product.

The terminal used by each clerk is an example of a mobile terminal, such as a smart-phone or mobile phone, which displays the message received from information processing device 10, and transmits the result operated by the clerk to the information processing device 10.

The information processing device 50 is an example of a computer that analyzes the image data received from the camera of each sales floor and detects a customer highly effective in customer service. Specifically, the information processing device 50 detects a person and a product from the image data, and obtains the skeletal information of the detected person. The information processing device 50 identifies the action of the person performed to the product on the basis of the skeletal information of the person. The information processing device 50 identifies a combination of an attribute of each product with the degree of interest in the product on the basis of an action of the person performed to the identified product.

For example, the information processing device 50 analyzes the image data received from the camera of each sales floor, and recognizes the action of each customer. Upon detection of a customer who performed an action conforming to the detection rules generated in the first embodiment, the information processing device 50 gives notice thereof to the clerk terminals.

Figure 14:
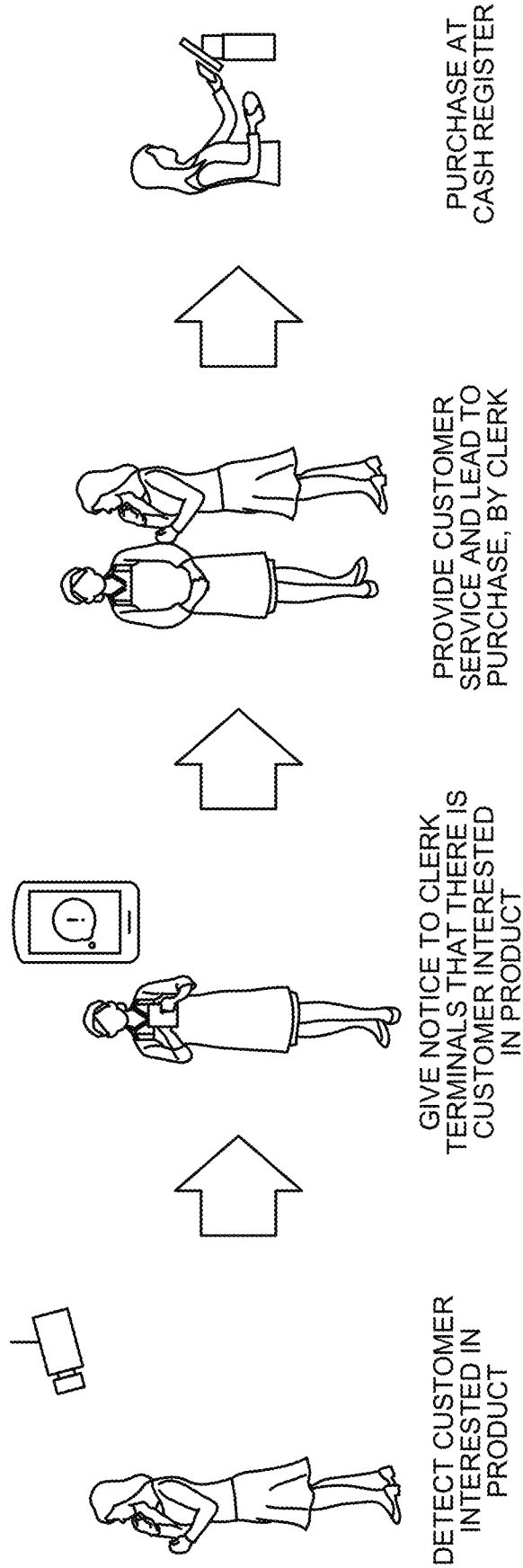
FIG. 14 is a diagram for explaining the flow of the customer service detection system according to the second embodiment.

FIG. 14 is a diagram for explaining the flow of the customer service detection system according to the second embodiment. As illustrated in FIG. 14, upon detection of a customer interested in a product on a certain sales floor A, on the basis of the detection rules, the information processing device 50 gives notice to the clerk terminals such that there is a customer interested in the product. At this time, the information processing device 50 may give notice of information on the detected sales floor A in addition.

As a result, a clerk can go to provide a customer service and lead to purchase, and the customer can purchase the product at the cash register after resolving his/her questions and/or concerns about the product. Therefore, it is possible to provide a customer service with high merits for both of the store and the customer.

Functional Configuration

Figure 15:
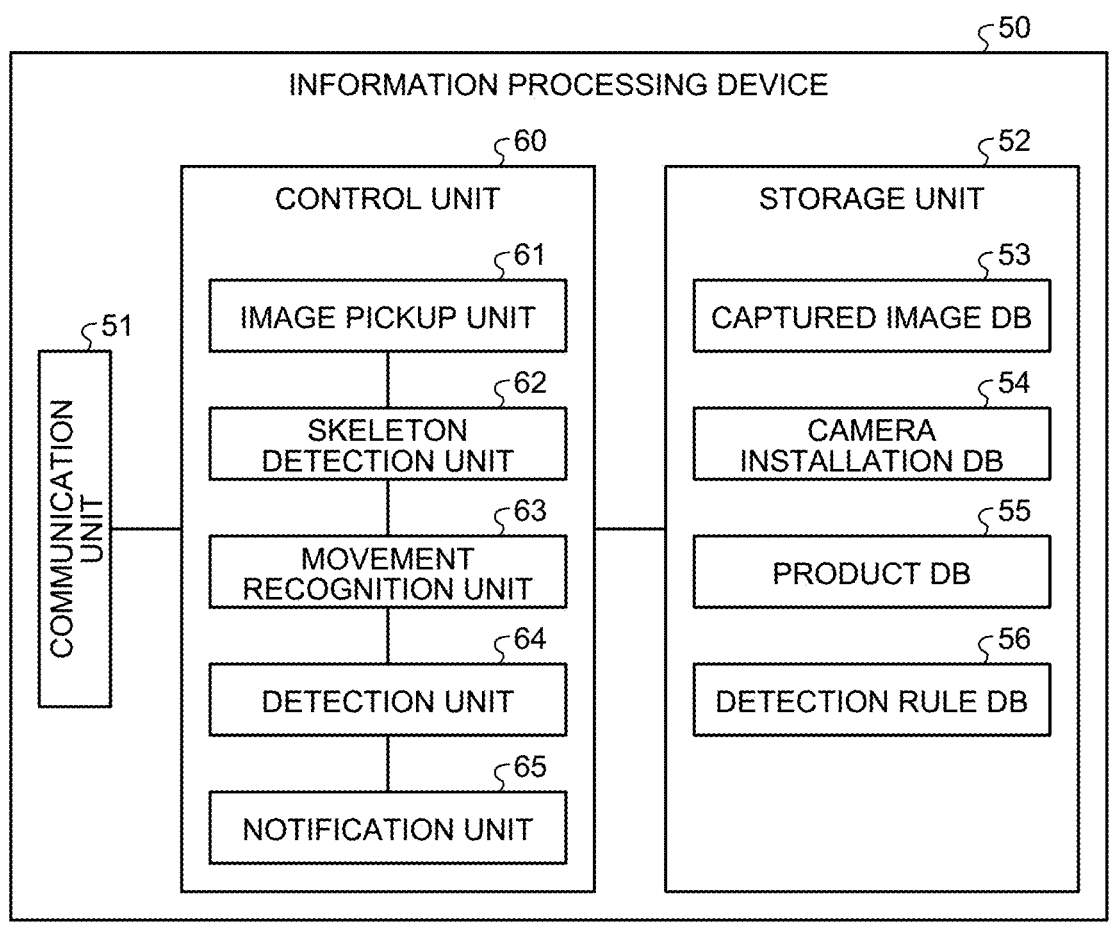
FIG. 15 is a functional block diagram illustrating the functional configuration of an information processing device according to the second embodiment.

FIG. 15 is a functional block diagram illustrating the functional configuration of the information processing device 50 according to the second embodiment. As illustrated in FIG. 15, the information processing device 50 includes a communication unit 51, a storage unit 52, and a control unit 60.

The communication unit 51 is a processing unit that controls communication with other devices, and is implemented by, for example, a communication interface. For example, the communication unit 51 receives moving image data (such as image data) from each camera, and transmits messages and image data to the clerk terminal.

The storage unit 52 is an example of a storage device that stores various data and programs to be executed by the control unit 60, and is implemented by, for example, a memory or hard disk. This storage unit 52 stores a captured image DB 53, a camera installation DB 54, a product DB 55, and a detection rule DB 56.

Each of the captured image DB 53, the camera installation DB 54, the product DB 55, and the detection rule DB 56 stores the same information as that of each of the captured image DB 13, the camera installation DB 14, the product DB 15, and detection rule DB 17 described in the first embodiment, and thus a detailed explanation about these DBs will be omitted.

The control unit 60 is a processing unit that controls the entire information processing device 50, and is implemented by, for example, a processor or the like. This control unit 60 includes an image pickup unit 61, a skeleton detection unit 62, a movement recognition unit 63, a detection unit 64, and a notification unit 65.

The image pickup unit 61 is a processing unit that captures images. For example, as in the image pickup unit 21 according to the first embodiment, the image pickup unit 61 receives image data captured by each camera, and stores the data in the captured image DB 53.

The skeleton detection unit 62 is a processing unit that obtains the skeletal information of a person appearing in image data. For example, the skeleton detection unit 62 executes skeleton detection, determination of the whole body posture, and detection of movements of individual parts, by use of technical methods of FIGS. 7 to 9 explained in the first embodiment, and outputs these results to the movement recognition unit 63.

The movement recognition unit 63 is a processing unit that executes recognition of a person's action while utilizing the skeleton detection, the determination of the whole body posture, and the detection of movements of individual parts performed by the skeleton detection unit 62. Specifically, the movement recognition unit 63 recognizes each movement that identifies an action by use of the technical methods explained in the first embodiment, and outputs the movement to the detection unit 64.

For example, on the basis of the skeleton detection by the skeleton detection unit 62, the movement recognition unit 63 recognizes each of the movements of "LOOKING AT FRONT FOR CERTAIN TIME", "UNMOVING", "STANDING", "STOOPING", and "SQUATTING". Further, on the basis of the skeleton detection by the skeleton detection unit 62, the movement recognition unit 63 recognizes each of the movements of "PUTTING ONE HAND FORWARD", "STRETCHING ONE ARM", "LOOKING AT ONE HAND", and "BENDING ONE ARM". Similarly, the movement recognition unit 63 recognizes each of the movements of "BENDING ONE ARM" and "LOOKING AT ONE HAND". Further, the movement recognition unit 63 recognizes each of the movements of "WRIST COORDINATES MOVING FREQUENTLY FOR CERTAIN TIME", "ELBOW AND WRIST COORDINATES MOVING FREQUENTLY FOR CERTAIN TIME", and "BODY ORIENTATION AND WHOLE BODY MOVEMENT CHANGING FREQUENTLY FOR CERTAIN TIME".

Here, without being limited to one movement, the movement recognition unit 63 may detect a plurality of consecutive movements by use of the respective pieces of skeletal information detected on the basis of a plurality of pieces of image data. For example, it is assumed that, in 10 frames, the movement recognition unit 63 recognizes the movement of "PUTTING ONE HAND FORWARD" in the 1st frame and keeps recognizing the movement of "PUTTING ONE HAND FORWARD" up to the 5th frame, and then recognizes the movement of "BENDING ONE ARM" at the 6th frame. In this case, the movement recognition unit 63 can recognize a serial action of from the movement of "PUTTING ONE HAND FORWARD" to the movement of "BENDING ONE ARM" movement.

The detection unit 64 is a processing unit that identifies a combination of an attribute of each product with the degree of interest in the product on the basis of an action of the person performed to the identified product. In other words, the detection unit 64 executes detection of a customer highly effective in customer service, that is a person who has performed an action conforming to the detection rules and is interested in a product. Then, the detection unit 64 outputs information about the detected sales floor, time, and person to the notification unit 65.

Detection Example 1

Figure 16C:
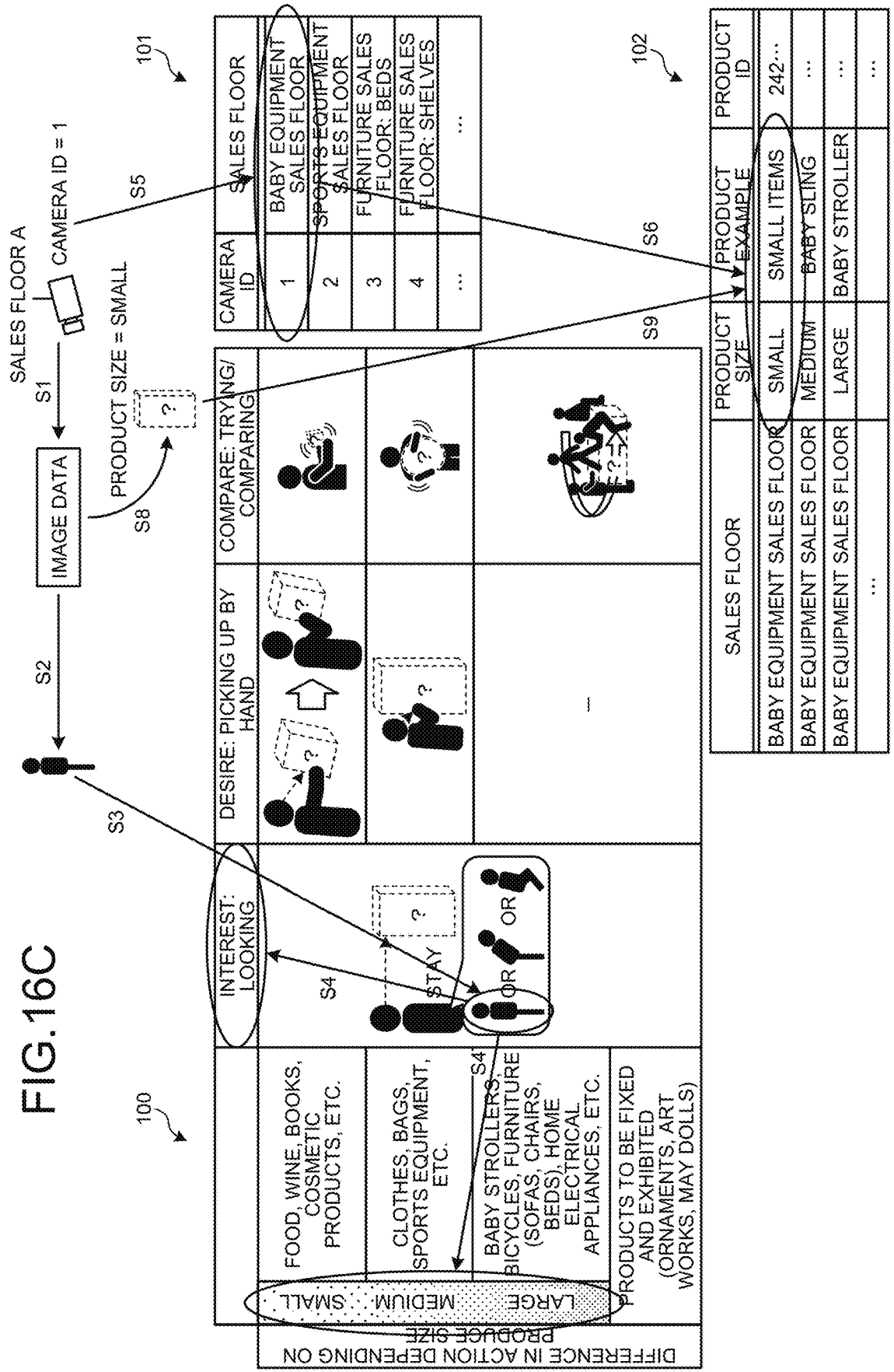
FIG. 16C is a diagram for explaining the detection example 1 according to the second embodiment.

FIGS. 16A, 16B, and 16C are diagrams for explaining a detection example 1 according to the second embodiment. As illustrated in FIG. 16A, the image pickup unit 61 obtains image data captured in the sales floor A (S1), and the movement recognition unit 63 detects the movement of "LOOKING AT FRONT FOR CERTAIN TIME" on the basis of the skeleton detection result to the image data by the skeleton detection unit 62 (S2). Then, the detection unit 64 refers to the detection rule DB 56 (S3), and identifies "the product attribute=small size, medium size, and large size, and the degree of interest=looking (INTEREST)" (S4), as a combination of the product attribute and the degree of interest, which are correlated with the movement of "LOOKING AT FRONT FOR CERTAIN TIME". That is, the detection unit 64 identifies the degree of interest (level 1). Then, the notification unit 65 transmit to the clerk terminals the combination of the product attribute and the degree of interest, i.e., "the product attribute=small size, medium size, large size, and the degree of interest=looking (INTEREST)" (S5).

At this time, as illustrated in FIG. 16B, when the movement of "LOOKING AT FRONT FOR CERTAIN TIME" is detected from the image data captured by the camera with the camera ID=1, the detection unit 64 can refer to the camera installation DB 54 and identify that the captured location is the baby equipment sales floor (S6). Then, the detection unit 64 refers to the product DB 55 and identifies small items, a baby sling, and a baby stroller as products corresponding to the product size=small, medium, and large (S7). As a result, the detection unit 64 identifies "the product attribute=small items, a baby sling, and a baby stroller, and the degree of interest=looking (INTEREST)" as a combination of the product attribute and the degree of interest.

Further, as illustrated in FIG. 16C, when a product appearing in the image data is identified that the product size is "SMALL" by the coordinates position specified in advance or image analysis (S8), the detection unit 64 can refer to the product DB 55, and identify the small items as a product corresponding to the product size=small (S9). As a result, the detection unit 64 identifies "the product attribute=small items, and the degree of interest=looking (INTEREST)" as a combination of the product attribute and the degree of interest.

Here, with reference to FIG. 16A, an explanation will be given of an example of the detection rule DB 56. The detection rule DB 56 contains information 100 that specifies the types of movement each performed by a person to a product for every combination of an attribute of the product and the degree of interest in the product.

The product attribute has categories each of which indicates one of the product sizes "LARGE", "MEDIUM", "SMALL", and "others". The product size of "LARGE" includes products, such as "BABY STROLLERS, BICYCLES, FURNITURE (SOFAS, CHAIRS, BEDS), HOME ELECTRICAL APPLIANCES, ETC". The product size of "MEDIUM" includes products, such as "CLOTHES, BAGS, SPORTS EQUIPMENT, ETC". The product size of "SMALL" includes products, such as "FOOD, WINE, BOOKS, COSMETIC PRODUCTS, ETC". Further, the product size of "others" includes "PRODUCTS TO BE FIXED/EXHIBITED (ORNAMENTS, ART WORKS, AND MAY DOLLS)".

The degree of interest in a product has categories each of which indicate one of a plurality of levels of interest in the product. The degree of interest corresponding to "LOOKING (INTEREST)" indicates the state of "low" of the level 1. The degree of interest corresponding to "PICKING UP BY HAND (DESIRE)" indicates the state of "medium" of the level 2. The degree of interest corresponding to "TRYING/COMPARING (COMPARE)" indicates the state of "high" of the level 3.

For example, when the type of movement performed by a person to each product is the movement of "LOOKING AT FRONT FOR CERTAIN TIME", this movement of "LOOKING AT FRONT FOR CERTAIN TIME" is correlated with each of the product sizes of "LARGE", "MEDIUM", "SMALL", and "others". Further, the movement of "LOOKING AT FRONT FOR CERTAIN TIME" is correlated with the degree of interest of "LOOKING (INTEREST)".

Next, with reference to FIG. 16B, an explanation will be given of an example of the camera installation DB 54. The camera installation DB 54 contains information that correlates the camera IDs with the sales floors. Each camera ID is information that identifies the corresponding camera. Each sale floor indicates the location where the corresponding camera captured an image. For example, the camera ID "1" is correlated with the sales floor of "BABY EQUIPMENT SALES FLOOR".

Next, with reference to FIG. 16C, an explanation will be given of an example of the product DB 55. The product DB 55 contains information 102 that correlates the sales floors, the product sizes, the product examples, and the product IDs with each other. Each sales floor indicates the sales floor of the corresponding product. Each product size indicates a product attribute. Each product example indicates a product name. Each product ID is information that identifies the corresponding product. For example, the sales floor of "BABY EQUIPMENT SALES FLOOR", the product size of "SMALL", the product example of "SMALL ITEMS" and the product ID "242 . . . " are correlated with each other.

Returning to FIGS. 16A, 16B, and 16C, an explanation will be given of the detection example 1 according to the second embodiment. Here, an example will be explained in which the detection unit 64 identifies a product by use of the camera installation DB 54, the product DB 55, and the detection rule DB 56, without identifying the product size by image analysis. In other words, in the detection example 1 according to the second embodiment, the detection unit 64 identifies a product appearing in image data, on the basis of the size of the product identified by referring to the detection rule DB 56.

Specifically, the detection unit 64 refers to the detection rule DB 56, and identifies "the type of movement performed by a person to the product" corresponding to "the movement based on the skeleton detection result". Then, the detection unit 64 identifies "a combination of the product attribute and the degree of interest" corresponding to "the type of movement performed by the person to the product".

Here, it is assumed that the detection unit 64 identifies "the product attribute=SMALL size, and the degree of interest=LOOKING (INTEREST)" as a combination of the product attribute and the degree of interest. At this time, the detection unit 64 refers to the camera installation DB 54, and identifies the "SALES FLOOR" by use of the camera ID that captured an image of the person who performed the detected movement. For example, the detection unit 64 identifies the "BABY EQUIPMENT SALES FLOOR". Then, the detection unit 64 refers to the product DB 55, and identifies the "PRODUCT SIZE and PRODUCT EXAMPLE" corresponding to the identified "SALES FLOOR". For example, the detection unit 64 identifies the "PRODUCT SIZE and PRODUCT EXAMPLE" corresponding to the "BABY EQUIPMENT SALES FLOOR".

Then, the detection unit 64 refers to the product DB 55, and identifies SMALL ITEMS as a product corresponding to the "SMALL size". Further, the detection unit 64 identifies the "LOOKING (INTEREST)" as the degree of interest in the SMALL ITEMS.

Consequently, for the person who performed the detected movement, the detection unit 64 can identify the name of the product, the degree of interest in the product, and the sales floor. The notification unit 65 transmits, to the clerk terminals owed by the clerks in charge of customer service, a message indicating the existence of a customer highly effective in customer service, along with at least one of the product name, the degree of interest in the product, and the product sales floor.

Detection Example 2

Figure 17:
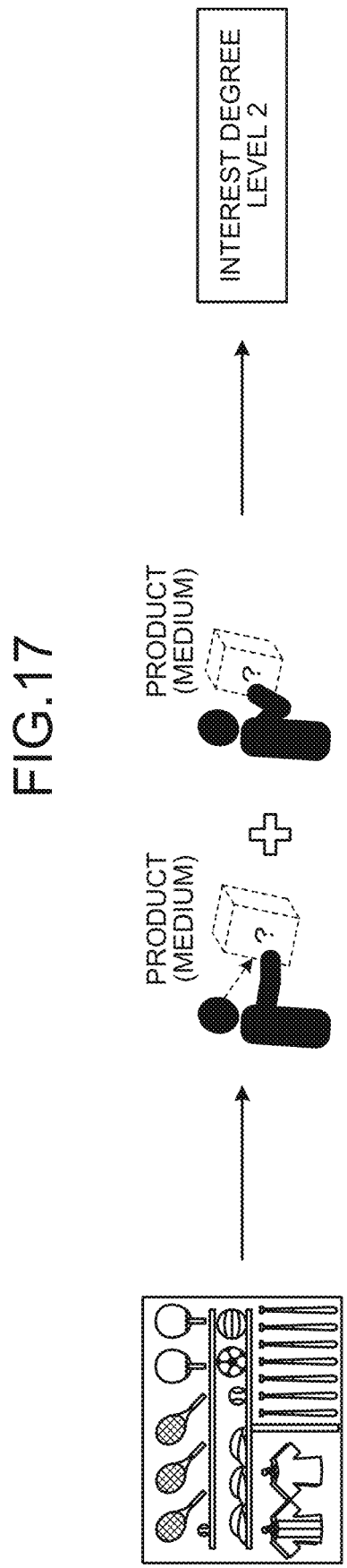
FIG. 17 is a diagram for explaining a detection example 2 according to the second embodiment.

FIG. 17 is a diagram for explaining a detection example 2 according to the second embodiment. As illustrated in FIG. 17, when a serial action of the movement of "PUTTING ONE HAND FORWARD" and the movement of "BENDING ONE ARM" is detected, the detection unit 64 identifies "the product size=SMALL and MEDIUM, and the degree of interest=PICKING UP BY HAND (DESIRE)" as a combination of the product attribute and the degree of interest. That is, the detection unit 64 identifies the degree of interest (level 2).

At this time, when the movements (action) described above are detected from image data captured by the camera with the camera ID=2, the detection unit 64 can refer to the camera installation DB 54, and identify that the captured location is the SPORTS EQUIPMENT SALES FLOOR. Then, the detection unit 64 refers to the product DB 55, and identifies a ball and a baseball glove as products corresponding to the product size=SMALL and MEDIUM. Consequently, the detection unit 64 identifies "the product attribute=a ball and a baseball glove, and the degree of interest=PICKING UP BY HAND (DESIRE)" as a combination of the product attribute and the degree of interest.

Further, when a product appearing in the image data is identified that the product size is "MEDIUM" by the coordinates position specified in advance or image analysis, the detection unit 64 can refer to the product DB 55, and identify the baseball glove as a product corresponding to the product size=MEDIUM. As a result, the detection unit 64 identifies "the product attribute=a baseball glove, and the degree of interest=PICKING UP BY HAND (DESIRE)" as a combination of the product attribute and the degree of interest.

Further, when the movement of "BENDING ONE ARM" or "LOOKING AT ONE HAND" is detected, the detection unit 64 identifies "the product size=LARGE, and the degree of interest=PICKING UP BY HAND (DESIRE)" as a combination of the product attribute and the degree of interest.

Detection Example 3

FIG. 18 is a diagram for explaining a detection example 3 according to the second embodiment. As illustrated in FIG. 18, when the movement of "BODY ORIENTATION AND WHOLE BODY MOVEMENT CHANGING FREQUENTLY FOR CERTAIN TIME" is detected, the detection unit 64 identifies "the product size=LARGE, and the degree of interest=TRYING/COMPARING (COMPARE)" as a combination of the product attribute and the degree of interest. That is, the detection unit 64 identifies the degree of interest (level 3).

At this time, when the movements described above is detected from image data captured by the camera with the camera ID=3, the detection unit 64 can refer to the camera installation DB 54, and identify that the captured location is the furniture sales floor (bed). Then, the detection unit 64 refers to the product DB 55, and identifies a bed as a product corresponding to the product size=LARGE. Consequently, the detection unit 64 identifies "the product attribute=a bed, the degree of interest=TRYING/COMPARING (COMPARE)" as a combination of the product attribute and the degree of interest.

Further, when the movement of "WRIST COORDINATES MOVING FREQUENTLY FOR CERTAIN TIME" is detected from image data captured by the camera with the camera ID=1, the detection unit 64 identifies the degree of interest for the product size=SMALL as the product attribute. That is, the detection unit 64 refers to the camera installation DB 54 and the product DB 55, and identifies "the product attribute=SMALL ITEMS, and the degree of interest=TRYING/COMPARING (COMPARE)" as a combination of the product attribute and the degree of interest.

Further, when the movement of "ELBOW AND WRIST COORDINATES MOVING FREQUENTLY FOR CERTAIN TIME" is detected from image data captured by the camera with the camera ID=1, the detection unit 64 identifies the degree of interest for the product size=MEDIUM as the product attribute. That is, the detection unit 64 refers to the camera installation DB 54 and the product DB 55, and identifies "the product attribute=BABY SLING, and the degree of interest=TRYING/COMPARING (COMPARE)" as a combination of the product attribute and the degree of interest.

Returning to FIG. 15, the notification unit 65 is a processing unit that executes notification to clerk terminals when a customer highly effective in customer service is detected. Specifically, the notification unit 65 transmits, to the clerk terminals owned by the clerks in charge of customer service, a message indicating the existence of the customer highly effective in customer service along with the name of the product. For example, the notification unit 65 transmits a message containing "the product name and the action" as the product attribute and the degree of interest.

Figure 19:
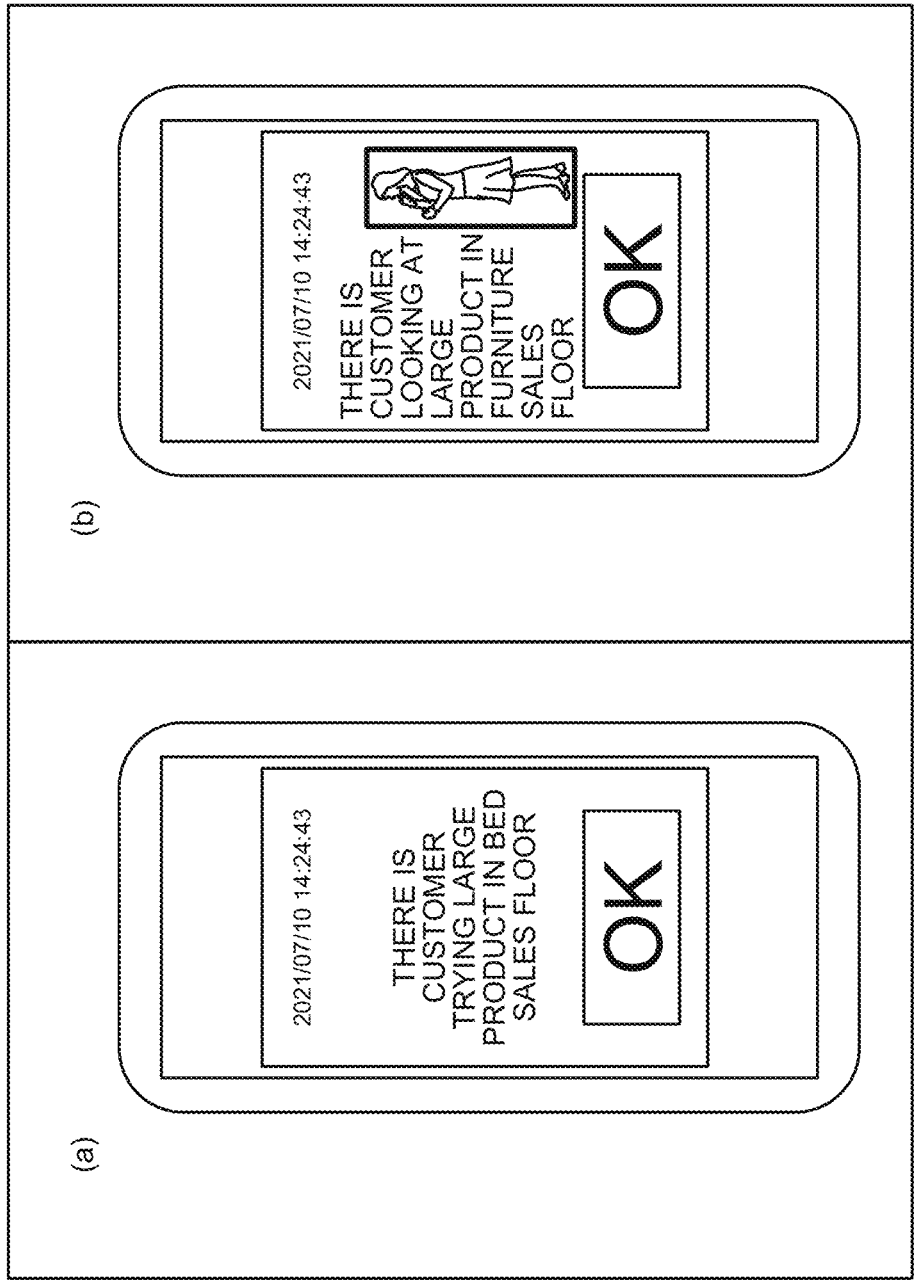
FIG. 19 is a diagram for explaining an example of notification to a clerk.

FIG. 19 is a diagram for explaining an example of notification to a clerk. As illustrated in FIG. 19, (a), when "the product attribute=a large product, and the degree of interest=TRYING/COMPARING (COMPARE)" is detected from image data captured in the bed sales floor, the notification unit 65 transmits, to the clerk terminals, a message reporting the detection of a customer who is trying the large product in the bed sales floor. Further, as illustrated in FIG. 19, (b), when "the product attribute=a large product, and the degree of interest=TRYING/COMPARING (COMPARE)" is detected from image data captured in the furniture sales floor, the notification unit 65 may transmit, to the clerk terminals, a message reporting the detection of a customer who is trying the large product in the furniture sales floor, along with the image data.

In addition, the notification unit 65 may transmit, to the clerk terminals, a message in accordance with the detected level of the degree of interest. For example, as the level is higher, the notification unit 65 may transmit a message identifying the customer and/or the product in more detail. Further, the notification unit 65 may transmit a message along with whether the degree of interest is high or low, or may transmit a message indicating at which level the customer is.

In addition, the notification unit 65 may transmit a message indicating the existence of a customer highly effective in customer service along with the degree of interest that constitutes the combination. As an explanation in the example described above, the notification unit 65 transmits, to the clerk terminals, a message such that "there is a customer trying a large product in the bed sales floor: the degree of interest (level 3)".

In addition, the notification unit 65 may arbitrarily select various types of information identified by the processing describe above, such as the sales floor, the product name, and so forth, and include such information in the message. The notification unit 65 may transmit, to the clerk terminals, a message such that "there is a customer trying a bed in the bed sales floor", "there is a customer asking for a customer service on the bed sales floor", "there is a customer asking for a customer service in the bed sales floor: the degree of interest (level 3)", or the like.

Processing Flow

Figure 20:
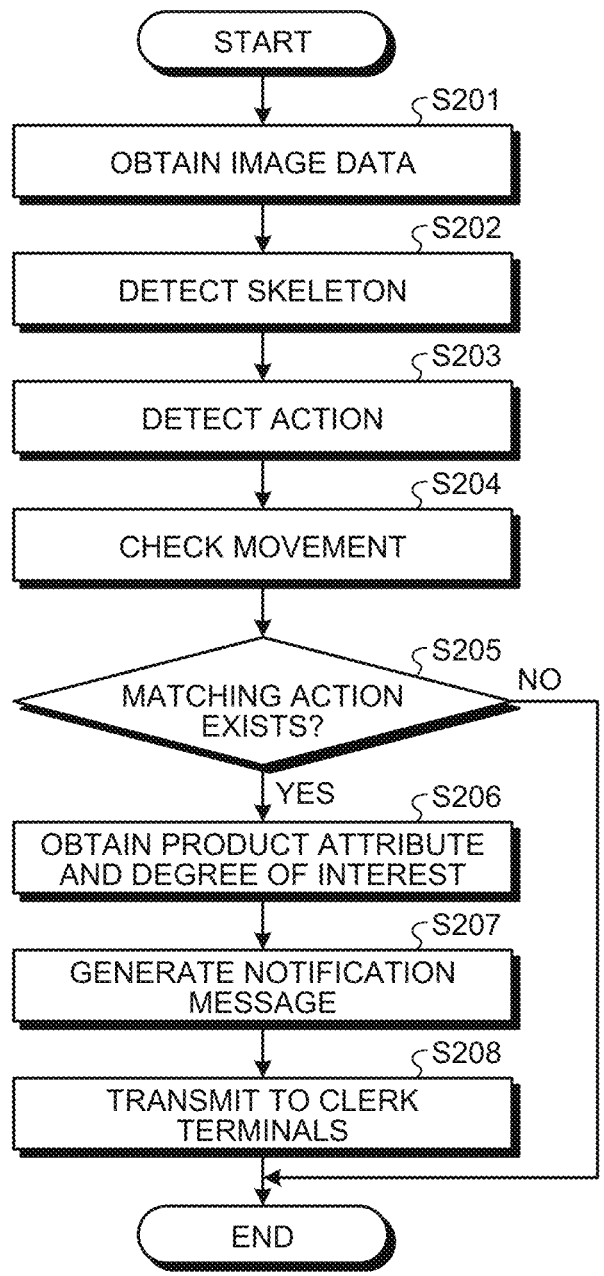
FIG. 20 is a flowchart illustrating the flow of processing in the customer service detection system according to the second embodiment.

FIG. 20 is a flowchart illustrating the flow of processing in the customer service detection system according to the second embodiment. As illustrated in FIG. 20, the information processing device 10 obtains image data (S201), and detects the skeletal information of a person from the image data (S202).

Then, on the basis of the skeletal information of the person, the information processing device 10 executes movement recognition. Specifically, the detection unit 64 identifies "the movement based on the skeleton detection result" of the person from the image data (S203). After that, the information processing device 10 checks the recognized movement with the detection rules. Specifically, the detection unit 64 refers to the detection rule DB 56, and checks "the type of movement performed by the person to the product" corresponding to "the movement based on the skeleton detection result" (S204). When a matching action exists (S205: Yes), the detection unit 64 obtains the product attribute (size) and the degree of interest (action) from the detection rules. Specifically, the detection unit 64 identifies "a combination of the product attribute and the degree of interest" corresponding to "the type of movement performed by the person to the product" from the detection rule DB 56 (S206).

Subsequently, the information processing device 10 generates a notification message using the product attribute (size) and the degree of interest (action). Specifically, the detection unit 64 refers to the camera installation DB 54, and identifies the "sales floor" on the basis of the camera ID that captured the person who performed the detected movement. After that, the detection unit 64 refers to the product DB 55, and identifies the "product attributes" and the "product names" corresponding to the identified "sales floor". Then, the detection unit 64 obtains the "product name" corresponding to the "product attribute" that constitutes the combination identified by S206 from the product DB 55. Further, the detection unit 64 identifies "the degree of interest" that constitutes the combination identified by S206. The detection unit 64 generates a message indicating the existence of a customer highly effective in customer service, along with the "sales floor", the "product name", and "the degree of interest" (S207). The information processing device 10 transmits the generated message to the clerk terminals (S208). Here, when no matching actions exist in S204 (S205: No), the information processing device 10 terminates the processing without executing S206.

Effect

As describe above, the information processing device 50 generates skeletal information of each person from image data, and detects the movements of the person from the time-series of changes in the posture obtained from the generated skeletal information of the person. The information processing device 50 obtains information that specifies the types of movement performed by the person to each product, for every combination of the product attribute (size, usage, or the like) and the degree of interest in the product. The information processing device 50 identifies each type of movement corresponding to the detected movement of the person, in the types of movement contained in the obtained information, and identifies the product attribute (size, usage, or the like) and the degree of interest in the product, which are correlated with identified type of movement.

That is, the information processing device 50 can detect a person who performed an action representing an interest in a product, on the basis of the detection rules, and give notice thereof to the clerks. Therefore, a clerk can give advices preferentially to a customer with a high degree of interest. On the other hand, even when a customer feels uncertain about purchase or difficult to consult voluntarily by himself/herself, the customer can make purchase with alleviated concerns by receiving advices from the clerk.

Further, the information processing device 50 can identify the actions of consumers in the store by applying a plurality of action processes leading up a consumer's purchase (such as AIDMA), which is known in the marketing field. For example, the information processing device 50 can detect a customer highly effective in customer service on the basis of the detection rules that evaluates Attention (stopping), Interest (looking and caring), Desire (picking up by hand), and Compare (trying) in a stepwise manner.

[c] Third Embodiment

Incidentally, the information processing device 50 includes various types of variation, without being limited to the contents explained in the second embodiment. Therefore, in the third embodiment, an explanation will be given of some variations of the processing to be executed by the information processing device 50.

Detection Rule

For example, in the second embodiment, an explanation has been given of an example of using the detection rules generated by the first embodiment, but this is not limiting. Other detection rules generated by the administrator or the like may be used. For example, the information processing device 50 may use detection rules that correlate the degree of interest for every combination of a person's action and a product, which have been generated on the basis of the past history, analysis by a statistical theory or the like, an empirical rule, etc.

Attribute Determination

Figure 21:
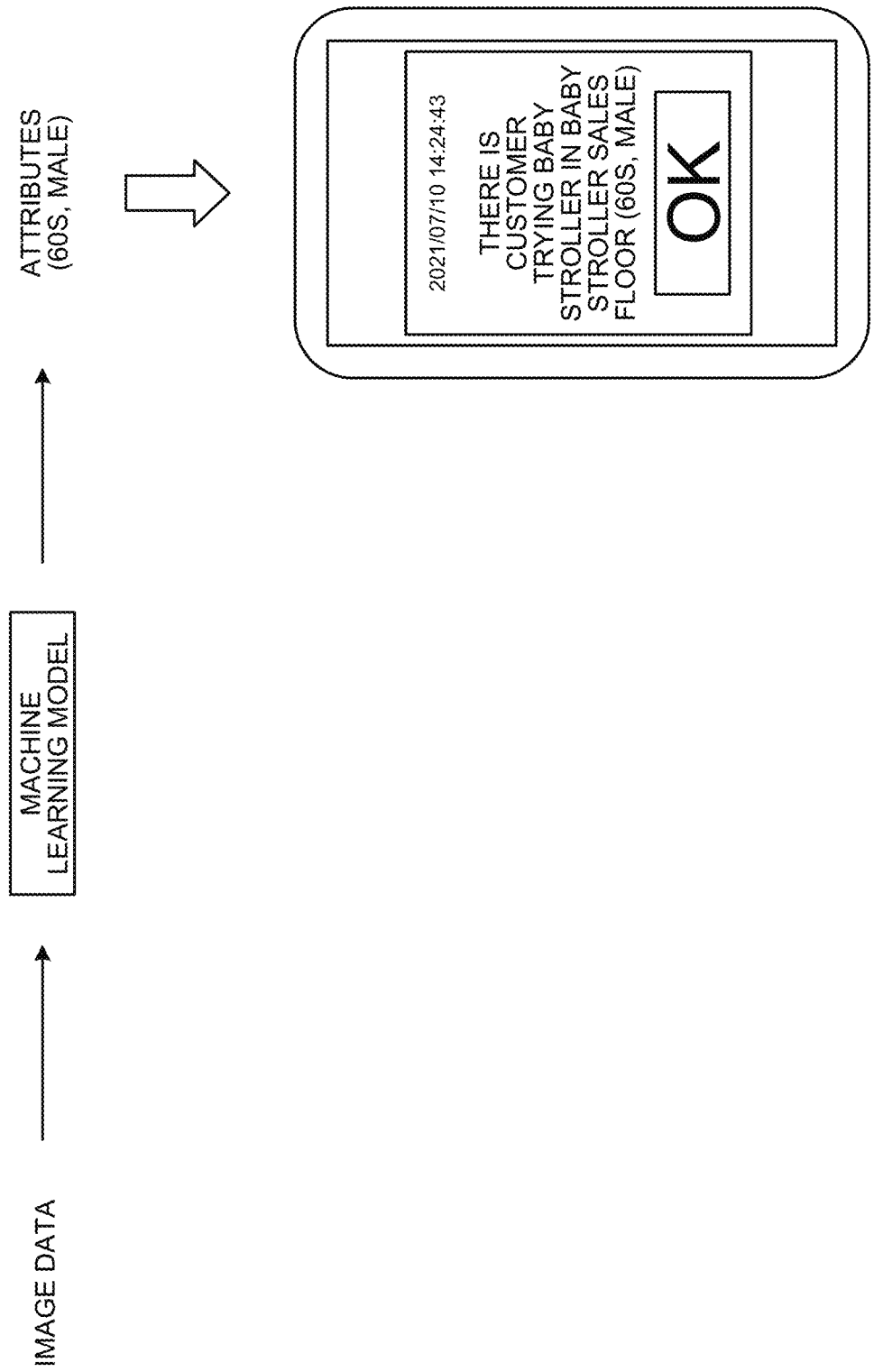
FIG. 21 is a diagram for explaining an example of notification of attribute determination according to a third embodiment.

For example, the information processing device 50 may further determine attributes, such as age and gender, of a person appearing in captured images and give notice thereof to the clerks. FIG. 21 is a diagram for explaining an example of notification of attribute determination according to the third embodiment. As illustrated in FIG. 21, the information processing device 50 inputs image data, in which the product attributes and the person's movements have been recognized, into a trained machine learning model, and obtains some attributes (60s and male) of a person appearing therein. Then, the information processing device 50 gives notice of a message including the attributes to the clerks, such that "THERE IS CUSTOMER TRYING BABY STROLLER IN BABY STROLLER SALES FLOOR (60S, MALE)". As a result, clerk can provide a customer service after obtaining detailed information, such as whether the person interested is a presenter or the actual user. Therefore, it is possible to perform an efficient customer service.

Notification of Consideration Time

Figure 22:
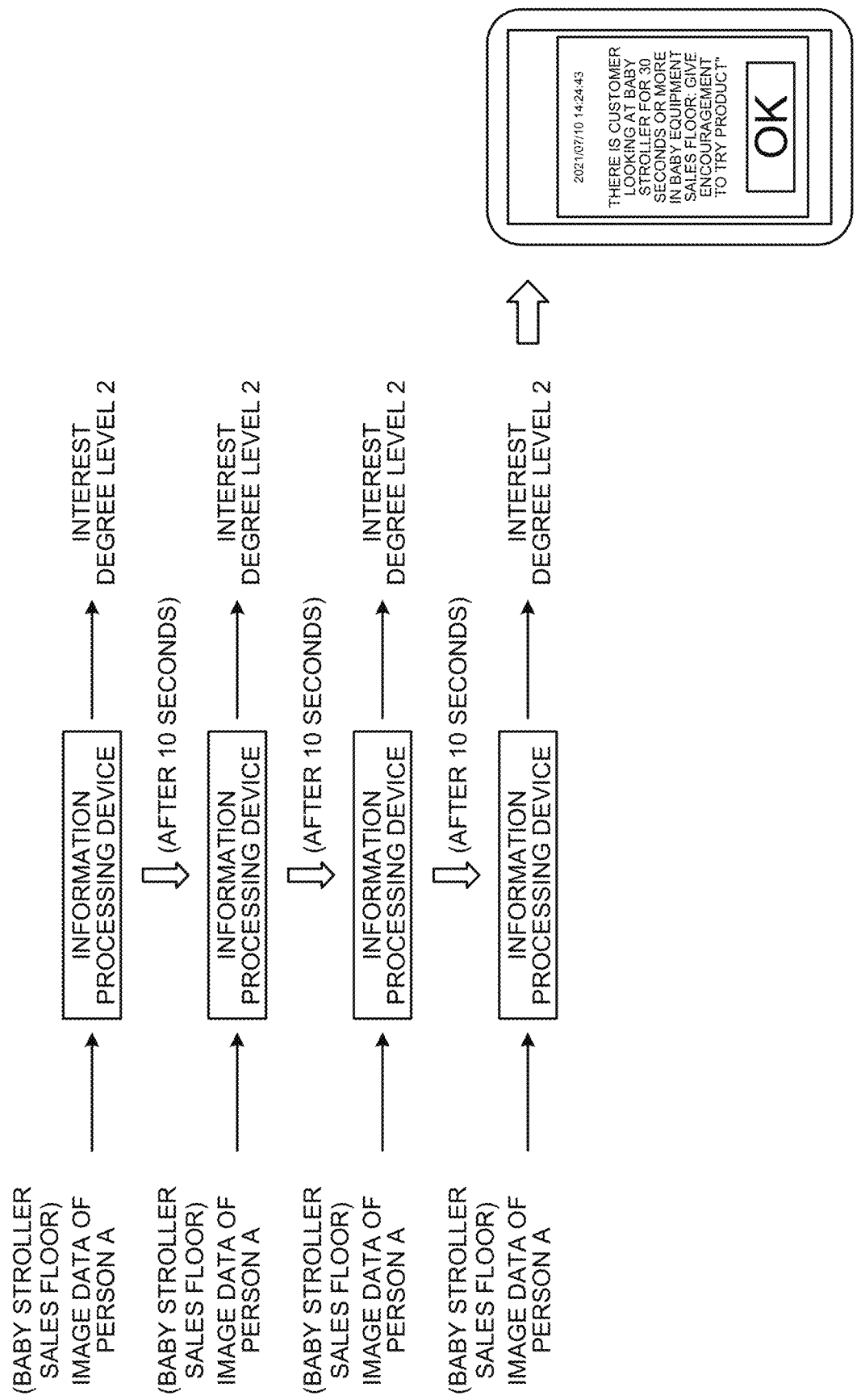
FIG. 22 is a diagram for explaining an example of notification of product consideration time according to the third embodiment.

For example, when the same action is recognized over a plurality of frames, the information processing device 50 may calculate the consideration time of a customer on a product, and give notice thereof to the clerks. FIG. 22 is a diagram for explaining an example of notification of the product consideration time according to the third embodiment. As illustrated in FIG. 22, it is assumed that the information processing device 50 detects the level 2 as the degree of interest from image data in the baby stroller sales floor in which a person A appears. It is further assumed that the information processing device 50 then detects the level 2 as the degree of interest continuously for 30 seconds from image data in the baby stroller sales floor in which the person A has appeared. In this case, the information processing device 50 may give notice of a message including the consideration time to the clerks, such that "there is a customer looking at a baby stroller for 30 seconds or more in the baby stroller sales floor".

At this time, the information processing device 50 may consider the stages of Attention (stopping), Interest (looking and caring), Desire (picking up by hand), and Compare (trying), and transmit a message to proceed with the next step. For example, the information processing device 50 may give notice of a message to the clerks such that "THERE IS CUSTOMER LOOKING AT BABY STROLLER FOR 30 SECONDS OR MORE IN BABY STROLLER SALES FLOOR: GIVE ENCOURAGEMENT TO TRY PRODUCT".

As a result, a clerk can grasp the state of the customer in advance of a customer service, and perform the customer service appropriately.

Feedback

Figure 23:
FIG. 23 is a diagram for explaining an example of feedback about a customer service result according to the third embodiment.

For example, after the notification to the clerk terminals, the information processing device 50 may collect the feedback of whether the product was actually purchased, and update the detection rules to keep the detection rules in the optimum state. FIG. 23 is a diagram for explaining an example of the feedback about a customer service result according to the third embodiment. As illustrated in FIG. 23, along with the message of "THERE IS CUSTOMER LOOKING AT BABY STROLLER FOR 30 SECONDS OR MORE IN BABY STROLLER SALES FLOOR: GIVE ENCOURAGEMENT TO TRY PRODUCT", the information processing device 50 may transmit, to the clerks, a screen to select "PURCHASE AFTER CUSTOMER SERVICE or NON-PURCHASE AFTER CUSTOMER SERVICE".

Then, the information processing device 50 may raise the level by one stage for a detection rule to which the feedback of "PURCHASE AFTER CUSTOMER SERVICE" is more than a threshold, and/or lower the level by one stage for a detection rule to which the feedback of "NON-PURCHASE AFTER CUSTOMER SERVICE" is more than a threshold, to maintain the detection rules in the state suited to the present situation.

Purchase Analysis

In addition, the information processing device 50 may perform purchase analysis of checking the POS data of the cash register with the action history, to check which action of the degree of interest led to the purchase. Consequently, it is possible to induce a customer service at the degree of interest one step before, and thereby lead to the purchase.

Figure 24:
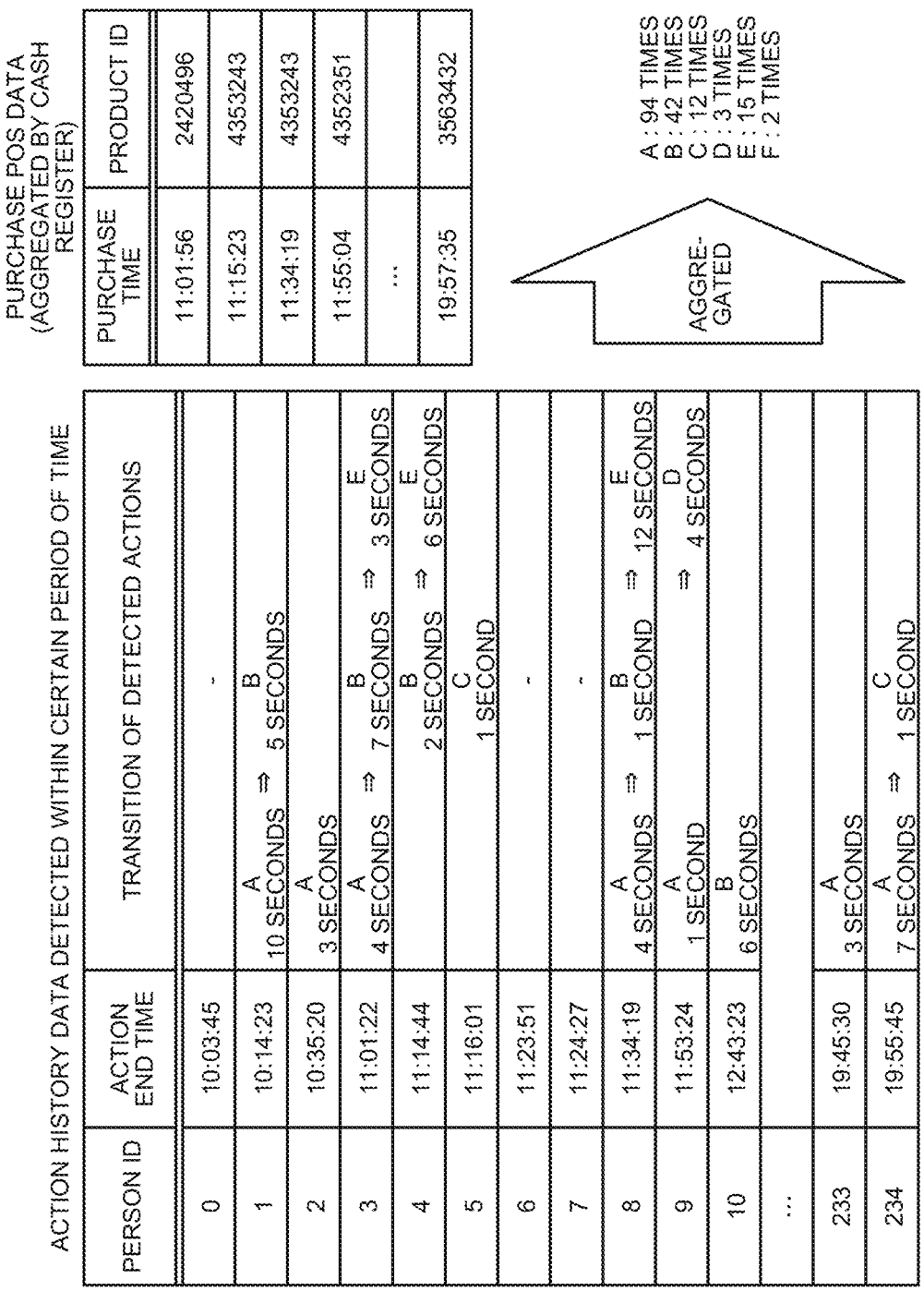
FIG. 24 is a diagram for explaining an example of purchasing action analysis.

FIG. 24 is a diagram for explaining an example of the purchasing action analysis. As illustrated in FIG. 24, the information processing device 50 collects the history data of actions detected within a certain period of time and the POS data indicating the purchase. Here, the history data of actions detected within a certain period of time includes the person IDs that identifies the recognized persons, the action end times each indicating the time when the series of action recognition ends, and the transition of the detected actions. For example, it is illustrated that a person with the person ID=1 performed an action A for 10 seconds and then performed an action B for 5 seconds with the end of the action B at "10:14:23". Here, each of the action A and the action B corresponds to one of the "LOOKING", "PICKING UP BY HAND", "TRYING", and so forth described above.

Then, the information processing device 50 aggregates the action history data, and counts up 4 times of action A, 42 times of action B, 12 times of action C, 3 times of action D, 15 times of action E, and 2 times of action F. Subsequently, the information processing device 50 checks the action history data with the POS data, and associates each action time with a purchase time close thereto of the POS data. Here, the determination of close ones can be performed by whether the difference between the two times is less than a threshold.

For example, in the action history data, the information processing device 50 identifies that a person with the person ID=3 performed an action A (for 4 seconds), an action B (for 7 seconds), and an action E (for 3 seconds) at "11:01:22". Further, in the POS data, the information processing device 50 identifies that a product with the product ID=2420496 was purchased at "11:01:56". As a result, the information processing device 50 determines that the person who performed "the action A (for 4 seconds), the action B (for 7 seconds), and the action E (for 3 seconds)" purchased the product with product ID=2420496.

Similarly, in the action history data, the information processing device 50 identifies that a person with the person ID=4 performed "the action B (for 2 seconds) and the action E (for 6 seconds)" at "11:14:44". Further, in the POS data, the information processing device 50 identifies that a product with the product ID=43532443 was purchased at "11:15:23". As a result, the information processing device 50 determines that the person who performed "the action B (for 2 seconds) and the action E (for 6 seconds)" purchased the product with product ID=43532443.

As a result of the association processing described above, the information processing device 50 identifies that, among the persons who performed actions up to the action E, the ratio of the persons who actually make purchase is greater than or equal to a threshold. Further, the information processing device 50 identifies that the ratio of the persons who performed the action B as a pre-action of the action E is greater than or equal to a threshold. As a result, the information processing device 50 identifies that many of the persons who perform actions up to the action E purchase products, and many of the persons who perform the action B perform the action E. Therefore, when a person performing action B is detected, the information processing device 50 may transmit a message to the clerks, which leads this person to the action E.

As described above, the information processing device 50 can identify the time-series of actions and utilize the same for the detection rules. As a result, the information processing device 50 can detect a customer more highly effective in customer service, and thereby improve the sales. Further, the information processing device 50 can provide detailed customer services, and thereby improve the customer attracting rate.

[d] Fourth Embodiment

Incidentally, the embodiments of the present invention have been described so far, but the present invention may be implemented in various different forms other than the embodiments described above.

Application Example

In the embodiments described above, an explanation has been given of image data as an example. However, this is not limiting, and moving picture data or the like may be processed in the same way. Further, in the second embodiment, an explanation has been given of a customer service detection example using the detection rules, but this is not limiting. The information processing device 50 may determine the degree of interest of a person in a product by a combination of the person's action and the product. That is, the information processing device 50 may use criteria that correlate the action, the product, and the degree of interest with each other.

Numerical Example

The data examples, the numerical examples, the information in each DB, the number of frames, the number of levels, the number of actions, the action examples, the correlation between movements and skeletal information, etc. used in the embodiments described above are mere examples and may be arbitrarily changed. Further, as the product attribute, the product size or product type has been described as examples, but this is not limiting. As the product attribute, the product usage or the like may be used.

System

The processing sequences, the control sequences, the specific names, and the information including various data and parameters disclosed in the above description and the drawings may be arbitrarily changed unless otherwise specified.

Further, the specific forms of distribution and integration of the constituent elements of each device are not limited to those illustrated in the drawings. For example, the information processing device 10 and the information processing device 50 may be implemented in the same housing. That is, all or some of the constituent elements may be functionally or physically distributed/integrated in any unit in accordance with various loads and/or use conditions. In addition, all or any part of each processing function of each device may be implemented by a CPU and a program that is analyzed and executed by the CPU, or may be implemented as hardware by wired logic.

Hardware

FIG. 25 is a diagram for explaining an example of a hardware configuration. Here, an explanation will be given of the information processing device 10 as an example, but this explanation can be applied to the information processing device 50 in the same way. As illustrated in FIG. 25, the information processing device 10 includes a communication device 10a, a Hard Disk Drive (HDD) 10b, a memory 10c, and a processor 10d. Further, these units illustrated in FIG. 25 are connected to each other by a bus or the like.

The communication device 10a is a network interface card or the like, and performs communication with other devices. The HDD 10b stores the programs and DBs for operating the functions illustrated in FIG. 2.

The processor 10d reads a program that executes the same processing as that of each processing unit illustrated in FIG. 2 from the HDD 10b or the like, and expands the program in the memory 10c to operate a process that executes each function explained with reference to FIG. 2 and so forth. For example, this process executes the same function as that of each processing unit included in the information processing device 10. Specifically, the processor 10d reads a program that includes the same functions as those of the image pickup unit 21, the follow-up unit 22, the skeleton detection unit 23, the movement recognition unit 24, the detection rule generation unit 25, and so forth, from HDD 10b or the like. Then, the processor 10d executes a process that executes the same processing parts as those of the image pickup unit 21, the follow-up unit 22, the skeleton detection unit 23, the movement recognition unit 24, the detection rule generation unit 25, and so forth.

As described above, the information processing device 10 operates as an information processing device that executes the generation method by reading and executing a program.

Alternatively, the information processing device 10 may realize the same functions as those of each embodiment described above by reading the program from a recording medium by a medium reader and executing the program thus read. Note that, in another embodiment, the program may be executed without being limited to the manner of execution by the information processing device 10. For example, the embodiment described above may be applied as well when another computer or server executes the program or when these devices work together to execute the program.

This program may be distributed via a network, such as the internet. This program may be recorded in a computer-readable recording medium, such as a hard disk, flexible disc (FD), CD-ROM, Magneto-Optical disk (MO), or Digital Versatile Disc (DVD), and executed by being read from the recording medium by a computer.

According to the embodiments, it is possible to detect a customer highly effective in customer service.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a generating program that causes a computer to execute a process comprising:
 obtaining each piece of image data captured by a camera installed in a store within a period of time from entering until exiting of a person at a store;
 generating joint positions of a three-dimensional skeleton of the person by inputting each piece of the image data into a trained machine learning model;
 identifying joint positions of a skeleton related to the person by analyzing the each piece of the image data;
 identifying the product on the basis of the each piece of the image data and coordinates of the product in the each piece of the image data and a size of identified product by referring to a product database storing information about products;
 determining a degree of interest of the person in the product, on a basis of the identified action for every size of the product;
 identifying, as an action which indicates the degree of interest of the person in the product, the action performed by the person to the product in the store from the entering until the exiting for every size of the product, on a basis of the joint positions of the skeleton;
 and generating a detection rule that correlates the identified action and size of the product and the determined degree of interest.

2. The non-transitory computer-readable recording medium according to claim 1, wherein the process further includes judging a posture of parts in the person based on the joint positions of the three-dimensional skeleton of the person, and identifying the action for the product by detecting a movement of the posture of parts.

3. The non-transitory computer-readable recording medium according to claim 1, wherein the process further includes determining the degree of interest of the person in the product, on a basis of the identified action.

4. The non-transitory computer-readable recording medium according to claim 3, wherein the determining includes
performing determination by use of whether the product was purchased, a number of times of touching the product, or a period of time of staying in front of the product.

5. The non-transitory computer-readable recording medium according to claim 1, wherein the detection rule specifies the action performed by the person for every combination of the size of the product and the degree of interest.

6. The non-transitory computer-readable recording medium according to claim 1, wherein the process further includes
counting a number of persons who purchased the product or did not purchase the product, among customer service target persons each identified with the action, as a result of a customer service performed using the detection rule, and
updating the degree of interest correlated with the action in the detection rule, on a basis of a counted result.

7. A generation method comprising executed by a computer, the generation method:
obtaining each piece of image data captured by a camera installed in a store within a period of time from entering until exiting of a person at a store;
generating joint positions of a three-dimensional skeleton of the person by inputting each piece of the image data into a trained machine learning model;
identifying joint positions of a skeleton related to the person by analyzing the each piece of the image data;
identifying the product on the basis of the each piece of the image data and coordinates of the product in the each piece of the image data and a size of identified product by referring to a product database storing information about products;
determining a degree of interest of the person in the product, on a basis of the identified action for every size of the product;
identifying, as an action which indicates the degree of interest of the person in the product, the action performed by the person to the product in the store from the entering until the exiting for every size of the product, on a basis of the joint positions of the skeleton; and generating a detection rule that correlates the identified action and size of the product and the determined degree of interest.

8. An information processing device comprising:
a memory; and
a processor coupled to the memory and configured to:
obtain each piece of image data captured by a camera installed in a store within a period of time from entering until exiting of a person at a store;
generate joint positions of a three-dimensional skeleton of the person by inputting each piece of the image data into a trained machine learning model;
identify joint positions of a skeleton related to the person by analyzing the each piece of the image data;
identify the product on the basis of the each piece of the image data and coordinates of the product in the each piece of the image data and a size of identified product by referring to a product database storing information about products;
determine a degree of interest of the person in the product, on a basis of the identified action for every size of the product;
identify, as an action which indicates the degree of interest of the person in the product, the action performed by the person to the product in the store from the entering until the exiting for every size of the product, on a basis of the joint positions of the skeleton; and
generate a detection rule that correlates the identified action and size of the product and the determined degree of interest.

9. The information processing device according to claim 8, wherein the processor configured to judge a posture of parts in the person based on the joint positions of the three-dimensional skeleton of the person, and identifying the action for the product by detecting a movement of the posture of parts.

10. The information processing device according to claim 8, wherein the processor configured to determine the degree of interest of the person in the product, on a basis of the identified action.

11. The information processing device according to claim 10, wherein the processor configured to perform determination by use of whether the product was purchased, a number of times of touching the product, or a period of time of staying in front of the product.

12. The information processing device according to claim 8, wherein the detection rule specifies the action performed by the person for every combination of the size of the product and the degree of interest.

13. The information processing device according to claim 8, wherein the processor configured to:
count a number of persons who purchased the product or did not purchase the product, among customer service target persons each identified with the action, as a result of a customer service performed using the detection rule, and
update the degree of interest correlated with the action in the detection rule, on a basis of a counted result.

* * * * *